(12) United States Patent
  Ikeda

(10) Patent No.: US 11,611,672 B2
(45) Date of Patent: Mar. 21, 2023

(54) TECHNIQUE FOR COOPERATION BETWEEN PLURALITY OF SEPARATE CONTROLLERS PROVIDED IN IMAGE FORMING APPARATUS

(71) Applicant: CANON KABUSHIKI KAISHA, Tokyo (JP)

(72) Inventor: Shinya Ikeda, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/581,422

(22) Filed: Jan. 21, 2022

(65) Prior Publication Data

US 2022/0239794 A1 Jul. 28, 2022

(30) Foreign Application Priority Data

Jan. 26, 2021 (JP) .............................. JP2021-010626
Nov. 10, 2021 (JP) .............................. JP2021-183449

(51) Int. Cl.
  *H04N 1/00* (2006.01)
(52) U.S. Cl.
  CPC ..... *H04N 1/00649* (2013.01); *H04N 1/00602* (2013.01); *H04N 1/00702* (2013.01); *H04N 1/00745* (2013.01)
(58) Field of Classification Search
  CPC ........... H04N 1/00602; H04N 1/00702; H04N 1/00649; H04N 1/00745; H04N 1/00612; H04N 1/0057; H04N 1/00588; H04N 1/00591; H04N 1/00623; H04N 1/00631; H04N 1/00681; H04N 1/00015; H04N 1/00037; H04N 1/00042; H04N 1/00087; H04N 1/00567; H04N 1/00615; H04N 1/00713; H04N 1/00748; H04N 1/00777; H04N 1/121; H04N 1/193; B65H 2511/20; B65H 43/00; B65H 2220/01; B65H 2220/02; B65H 2402/10; B65H 2511/10; B65H 2511/514; B65H 2513/50; B65H 2557/25; B65H 2701/1311; B65H 2701/1313; B65H 5/062; B65H 7/02;
  (Continued)

(56) References Cited

U.S. PATENT DOCUMENTS

| 8,794,730 B2 * | 8/2014 | Yamamoto ................. B41J 3/60 |
| | | 347/104 |
| 10,571,849 B2 * | 2/2020 | Yamamoto ............. B65H 31/10 |

(Continued)

FOREIGN PATENT DOCUMENTS

| JP | 2004-037916 A | 2/2004 |
| JP | 2011-019324 A | 1/2011 |

*Primary Examiner* — Negussie Worku
(74) *Attorney, Agent, or Firm* — Venable LLP

(57) ABSTRACT

In a case where a recording medium is to be stopped on a conveyance path and a length of the recording medium is a first length, a first controller stops a first motor upon a sensor detecting the front end of the recording medium, and a second controller stops a second motor upon the sensor detecting the front end of the recording medium. In a case where the recording medium is to be stopped on the conveyance path and the length of the recording medium is a second length, the first controller stops the first motor upon the sensor detecting the front end of the recording medium, and the second controller continues driving of the second motor even if the sensor detects the front end of the recording medium.

6 Claims, 16 Drawing Sheets

(58) Field of Classification Search
CPC .. B65H 7/20; B65H 2220/03; B65H 2220/11; B65H 2511/13; B65H 2511/22; B65H 2511/30; B65H 2513/10; B65H 2515/12; B65H 2515/40; B65H 2601/273; B65H 2801/06; B65H 29/50; B65H 29/683; B65H 31/10; B65H 31/24; B65H 43/06; B65H 2511/15; B65H 2515/10; B41J 13/0009; G03G 15/50; G03G 15/5062; G03G 15/6529; G03G 21/1604; G03G 15/6573; G03G 15/00; G03G 15/2003; G03G 15/5025; G03G 15/5029; G03G 15/5054; G03G 15/60; G03G 15/607; G03G 15/6567; G03G 15/70; G03G 2215/00067; G03G 2215/00189; G03G 2215/00417; G03G 2215/00556; G03G 2215/00616; G03G 2215/00721
USPC .......................................................... 358/488
See application file for complete search history.

(56) References Cited

U.S. PATENT DOCUMENTS

| | | | |
|---|---|---|---|
| 2017/0087893 A1* | 3/2017 | Sakaguchi | B41J 13/0036 |
| 2018/0246459 A1* | 8/2018 | Yamamoto | G03G 15/5029 |
| 2019/0086854 A1* | 3/2019 | Anzai | B65H 23/16 |
| 2021/0306497 A1* | 9/2021 | Tokuma | G03G 15/5062 |
| 2021/0360116 A1* | 11/2021 | Nagata | G03G 15/5062 |
| 2022/0239794 A1* | 7/2022 | Ikeda | H04N 1/00745 |

* cited by examiner

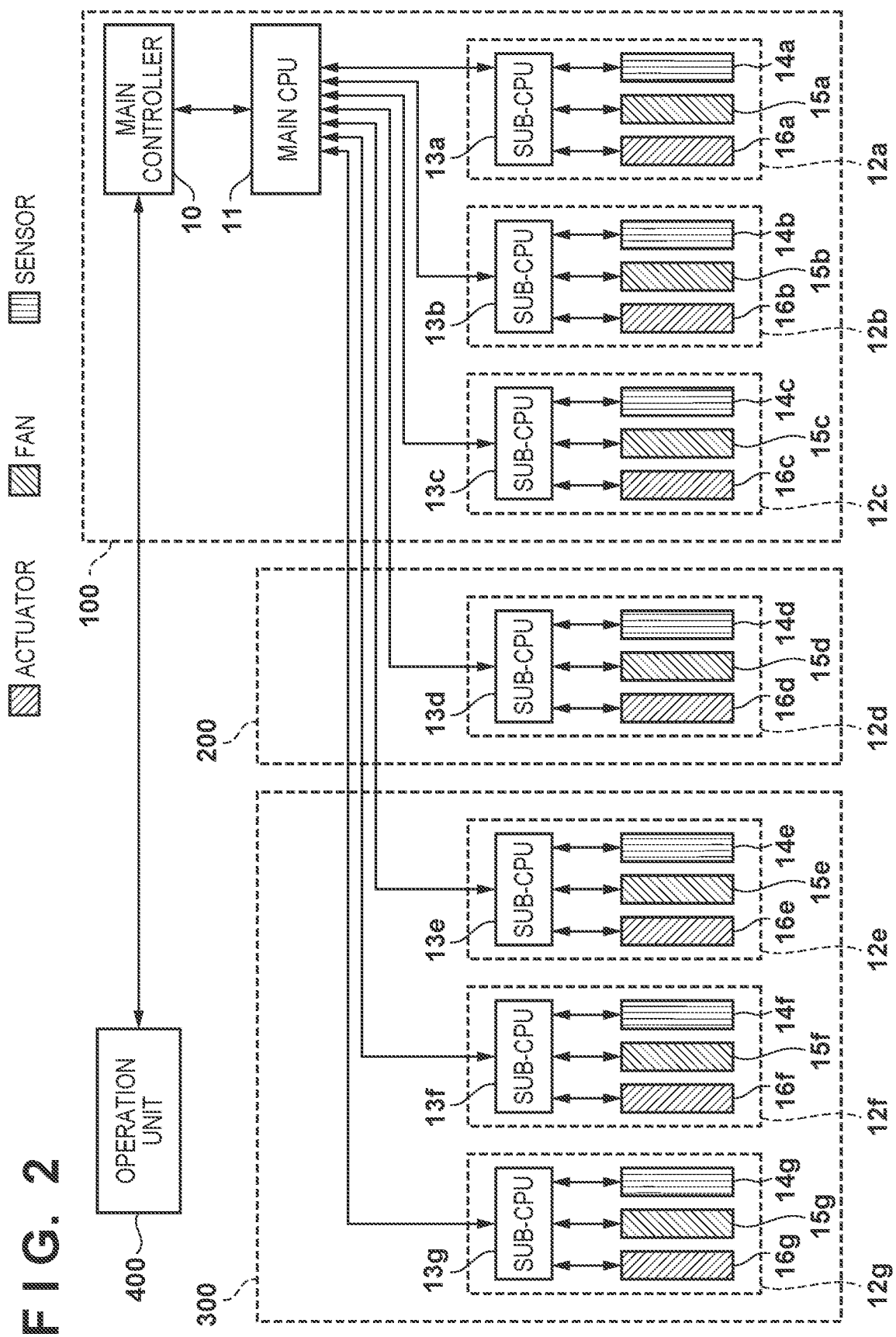

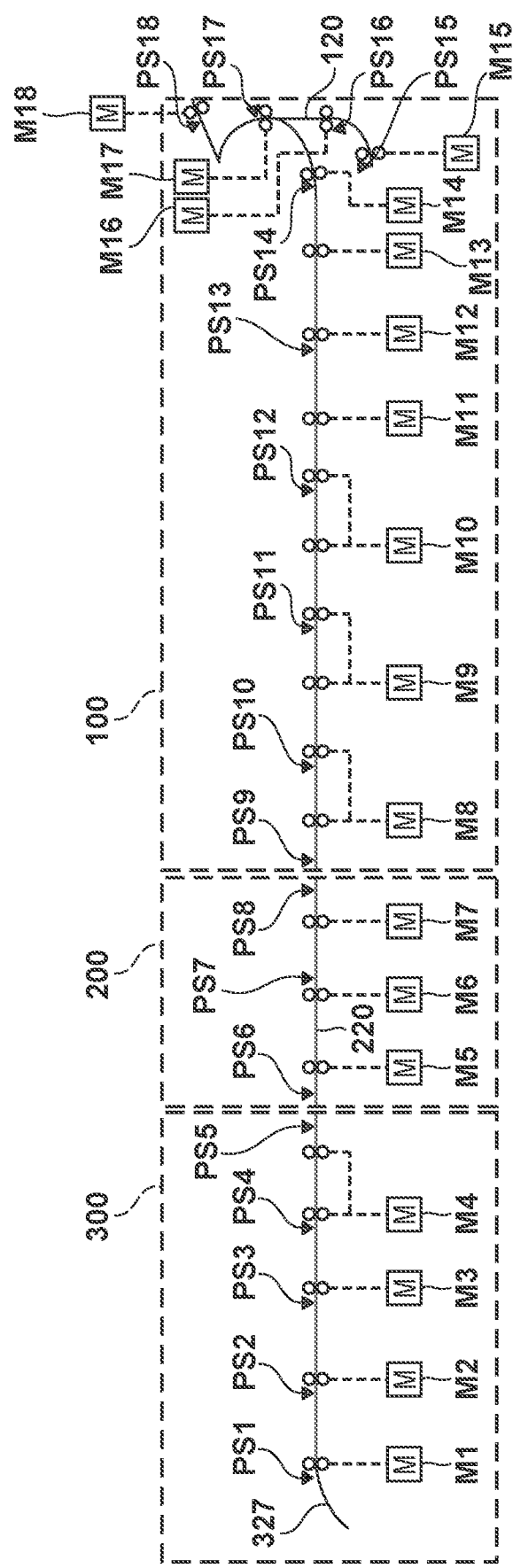

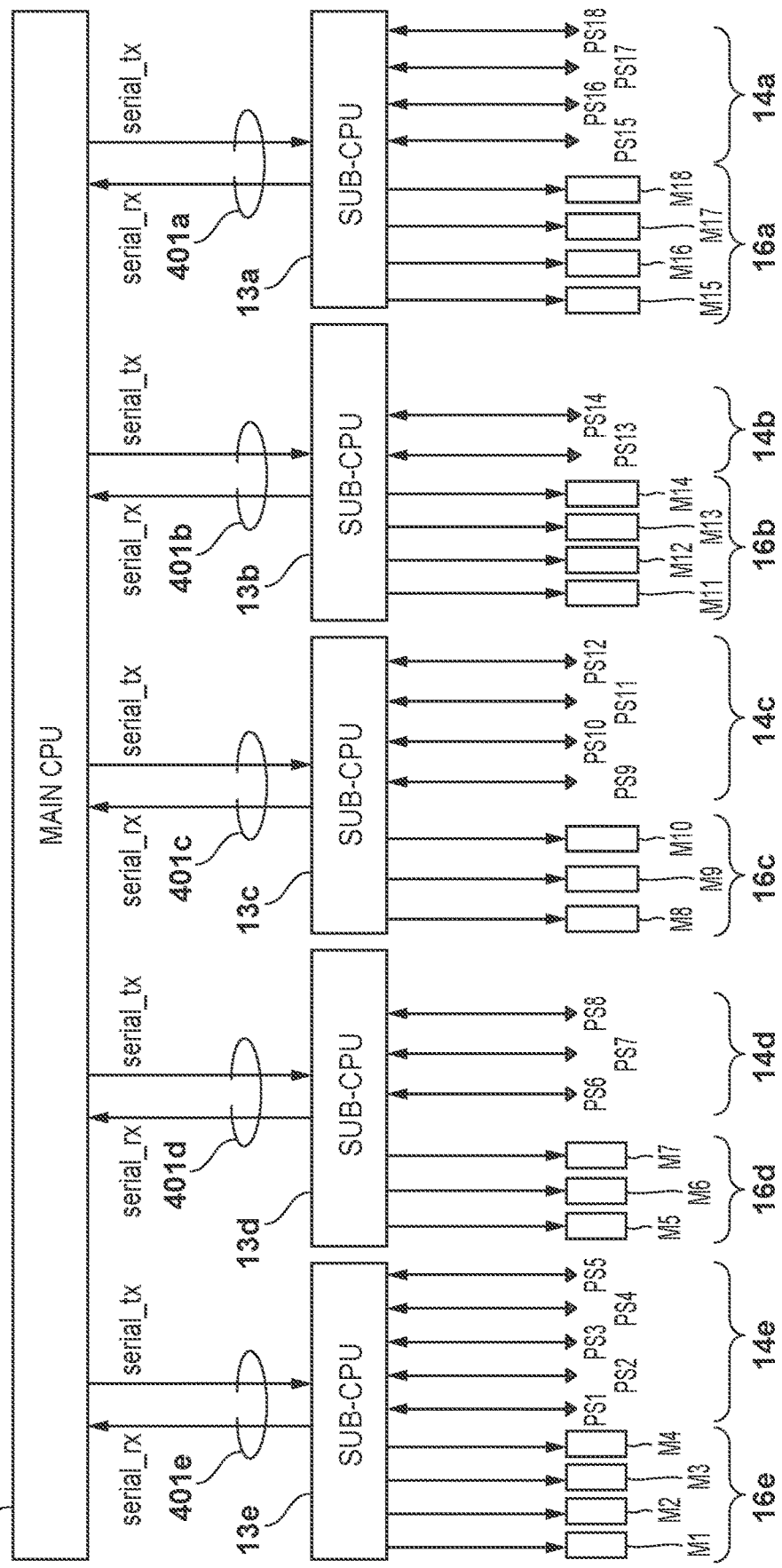

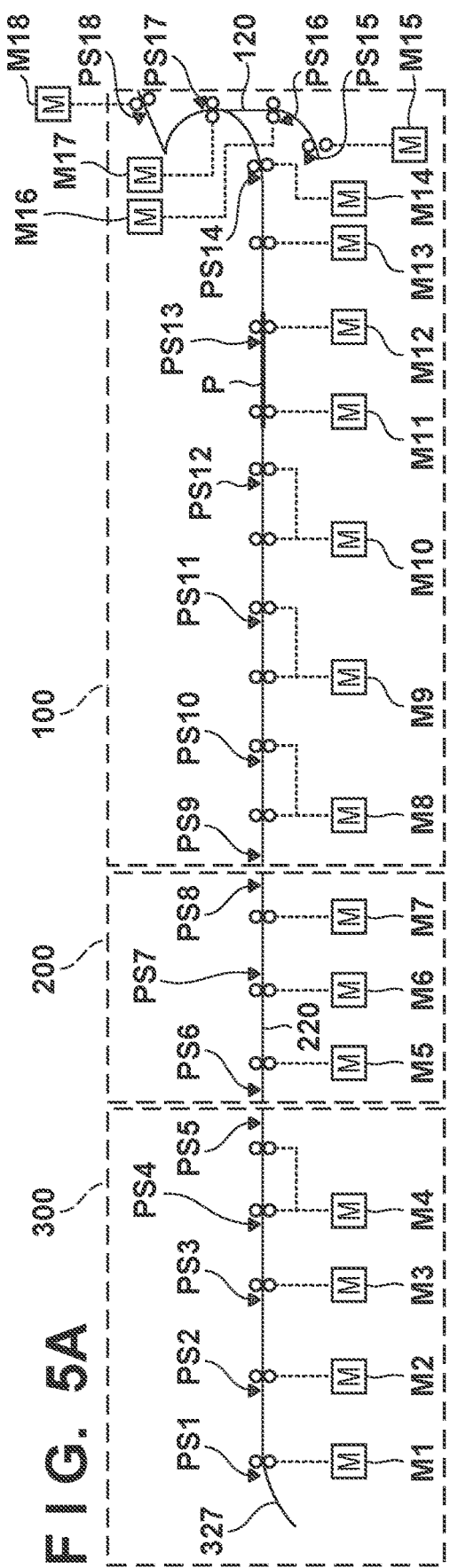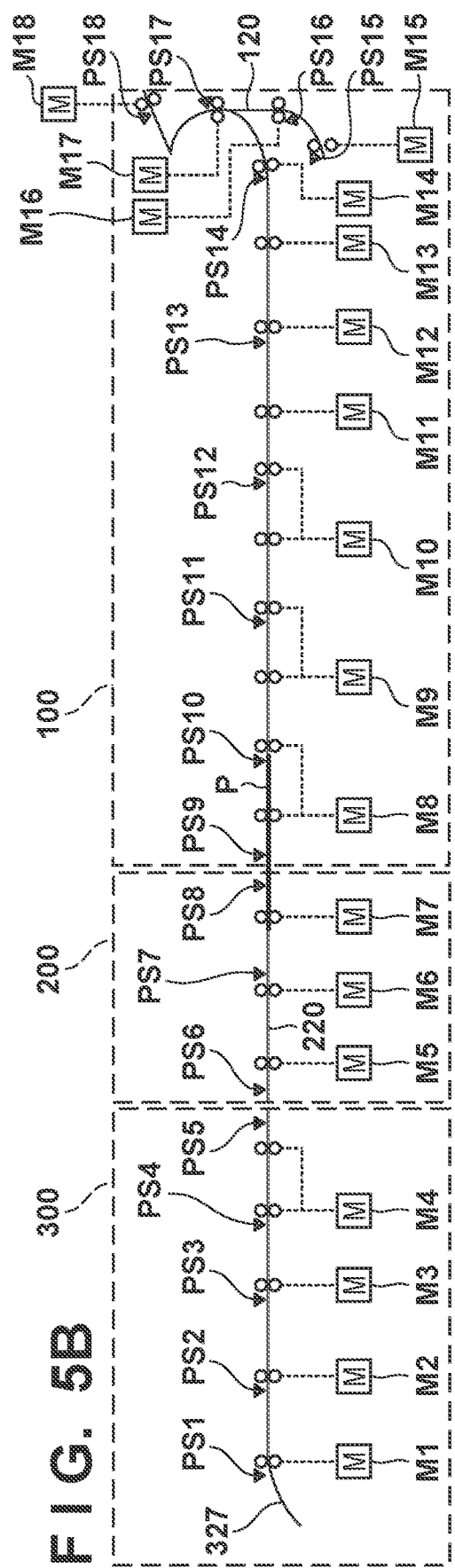

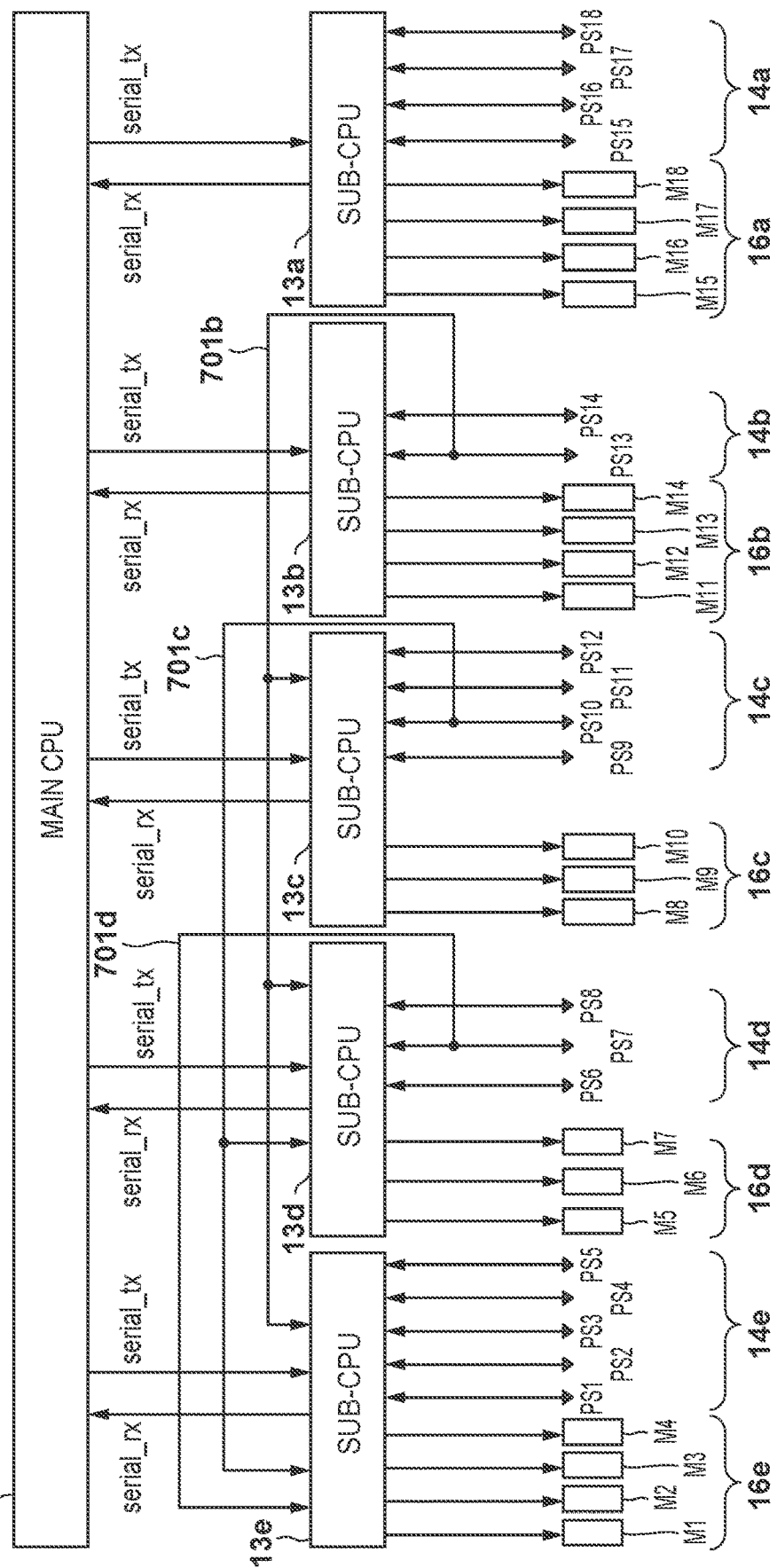

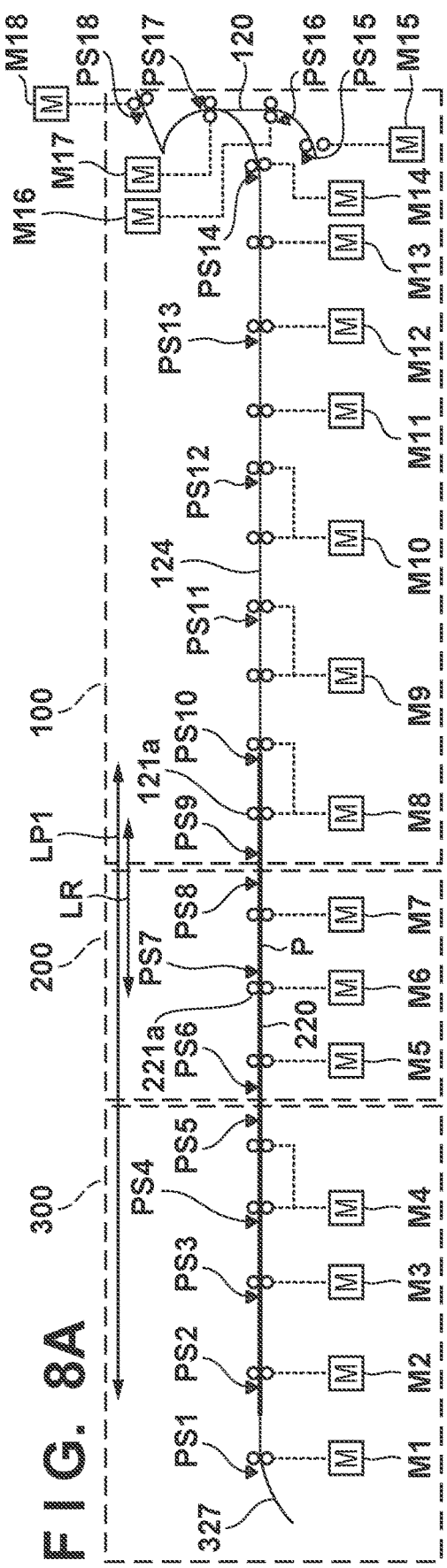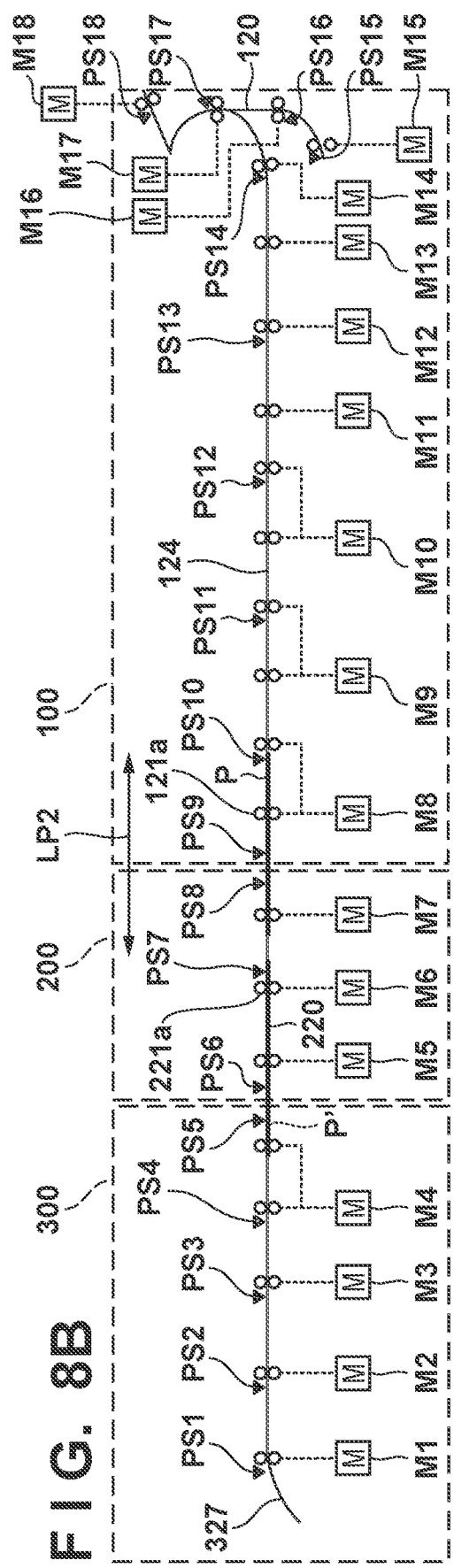

FIG. 10

| SHEET LENGTH L[mm] | REFERENCE SENSOR | SUB-CPU 13e | | | | SUB-CPU 13d | | | SUB-CPU 13c | | | SUB-CPU 13b | | | |
|---|---|---|---|---|---|---|---|---|---|---|---|---|---|---|---|
| | | M1 | M2 | M3 | M4 | M5 | M6 | M7 | M8 | M9 | M10 | M11 | M12 | M13 | M14 |
| L≤200 | PS13 | | | | | | | | | | | | | | |
| | PS10 | | | | | | | | | | | ● | ● | | |
| | PS7 | | | | | | | | ● | | | | | | |
| | PS4 | | | | | ● | ● | | | | | | | | |
| 200<L≤400 | PS13 | | | | | | | | | | | ● | ● | | |
| | PS10 | | | | | | | | | | ● | ● | ● | | |
| | PS7 | | | | | | | | ● | | | | | | |
| | PS4 | | | ● | ● | ● | ● | | | | | | | | |
| 400<L≤600 | PS13 | | | | | | | | | | | ● | ● | | |
| | PS10 | | | | | | | | | | ● | ● | ● | | |
| | PS7 | | | | | ● | ● | ● | ● | | | | | | |
| | PS4 | | ● | ● | ● | ● | ● | | | | | | | | |
| 600<L≤800 | PS13 | ● | | | | | | | | | | ● | ● | | |
| | PS10 | | | | | | | | | ● | ● | ● | ● | | |
| | PS7 | | | | | ● | ● | ● | ● | | | | | | |
| | PS4 | | ● | ● | ● | ● | ● | | | | | | | | |
| 800<L≤1000 | PS13 | | | | | | | | | | | ● | ● | | |
| | PS10 | | | | | | | | | ● | ● | ● | ● | | |
| | PS7 | | | | | ● | ● | ● | ● | | | | | | |
| | PS4 | | | ● | ● | ● | ● | | | | | | | | |
| 1000<L≤1200 | PS13 | | | | | | | | | | | ● | ● | | |
| | PS10 | | | | | | | | | ● | ● | ● | ● | | |
| | PS7 | | | | | ● | ● | ● | ● | | | | | | |
| | PS4 | | | | ● | ● | ● | | | | | | | | |

TECHNIQUE FOR COOPERATION BETWEEN PLURALITY OF SEPARATE CONTROLLERS PROVIDED IN IMAGE FORMING APPARATUS

BACKGROUND OF THE INVENTION

Field of the Invention

The present invention relates to a technique for cooperation between a plurality of separate controllers provided in an image forming apparatus.

Description of the Related Art

According to Japanese Patent Laid-Open No. 2004-037916, a controller of an image forming apparatus controls a motor for driving a conveyance roller based on a timing at which a front end of a sheet is detected by a sheet sensor (Japanese Patent Laid-Open No. 2004-037916). Japanese Patent Laid-Open No. 2011-019324 proposes to separate controllers into a central control IC (integrated circuit) and distributed control ICs, and to connect a plurality of motors to distributed control ICs. Since a distributed control IC is disposed near a motor, it is possible to shorten a length of a cable connecting the motor and the controller.

Low-end image forming devices are sufficient to be able to form images on fixed-size sheets such as A4 and B5, but high-end image forming devices are required to be able to form images on a larger number of types of sheets. In particular, a large number of conveyance rollers are disposed in a conveyance path of a high-end image forming apparatus. Whereas a sheet of a B5 size is conveyed by being sandwiched simultaneously by two conveyance rollers, there are cases where a long sheet is conveyed by being sandwiched simultaneously by twelve conveyance rollers. In order to adjust a temperature of a fixing device, when the conveyance of the sheet is temporarily stopped, twelve conveyance rollers are required to stop at the same time. When the twelve conveyance rollers stop at different timings, a long sheet may be bent in a conveyance direction or the long sheet may be torn. Meanwhile, when all of the twelve conveyance rollers are stopped for short sheets, the sheets stop with a relatively large distance (sheet interval) between a preceding sheet and a succeeding sheet. As a result, after the conveyance of the sheet is restarted, the conveyance of the sheets is continued in a state in which the sheet interval is relatively long, so that the productivity of the image forming apparatus may be lower.

SUMMARY OF THE INVENTION

The present invention provides an image forming apparatus comprising: an image forming unit configured to form an image on a recording medium; a conveyance path configured to guide the recording medium of which an image has been formed on a first surface by the image forming unit to the image forming unit so that an image is formed on a second surface of the recording medium by the image forming unit, wherein the second surface is a surface that is opposite to the first surface; a first conveyance roller arranged on the conveyance path and configured to convey the recording medium; a first motor configured to drive the first conveyance roller; a first controller configured to control the first motor; a second conveyance roller arranged on the conveyance path upstream of the first conveyance roller in a conveyance direction in which the recording medium is conveyed and configured to convey the recording medium; a second motor configured to drive the second conveyance roller; a second controller configured to control the second motor; and a first sensor arranged on the conveyance path downstream of the first conveyance roller in the conveyance direction and configured to detect a front end of the recording medium, wherein the first sensor is connected to the first controller and the second controller, wherein in a case where the recording medium is to be stopped on the conveyance path and a length of the recording medium in the conveyance direction is a first length, the first controller stops the first motor in accordance with the first sensor detecting the front end of the recording medium, and the second controller stops the second motor in accordance with the first sensor detecting the front end of the recording medium, the first length being longer than a distance from the first conveyance roller to the second conveyance roller, and wherein, in a case where the recording medium is to be stopped on the conveyance path and the length of the recording medium in the conveyance direction is a second length that is shorter than the first length, the first controller stops the first motor in accordance with the first sensor detecting the front end of the recording medium, and the second controller continues driving of the second motor even if the first sensor detects the front end of the recording medium, wherein the second length is shorter than the distance from the first conveyance roller to the second conveyance roller.

Further features of the present invention will become apparent from the following description of exemplary embodiments (with reference to the attached drawings).

BRIEF DESCRIPTION OF THE DRAWINGS

FIG. 2 is a view for describing a controller.

FIG. 3 is a view for describing conveyance rollers in a conveyance path.

FIG. 4 is a view for describing a serial communication line connecting a main CPU and the sub CPU.

FIGS. 5A and 5B are diagrams for describing reference sensors.

FIG. 7 is a view for describing a shared signal line of a first embodiment.

FIGS. 8A and 8B are views for describing sheets with different lengths.

FIG. 10 is a view for describing a matrix.

DESCRIPTION OF THE EMBODIMENTS

Figure 1:
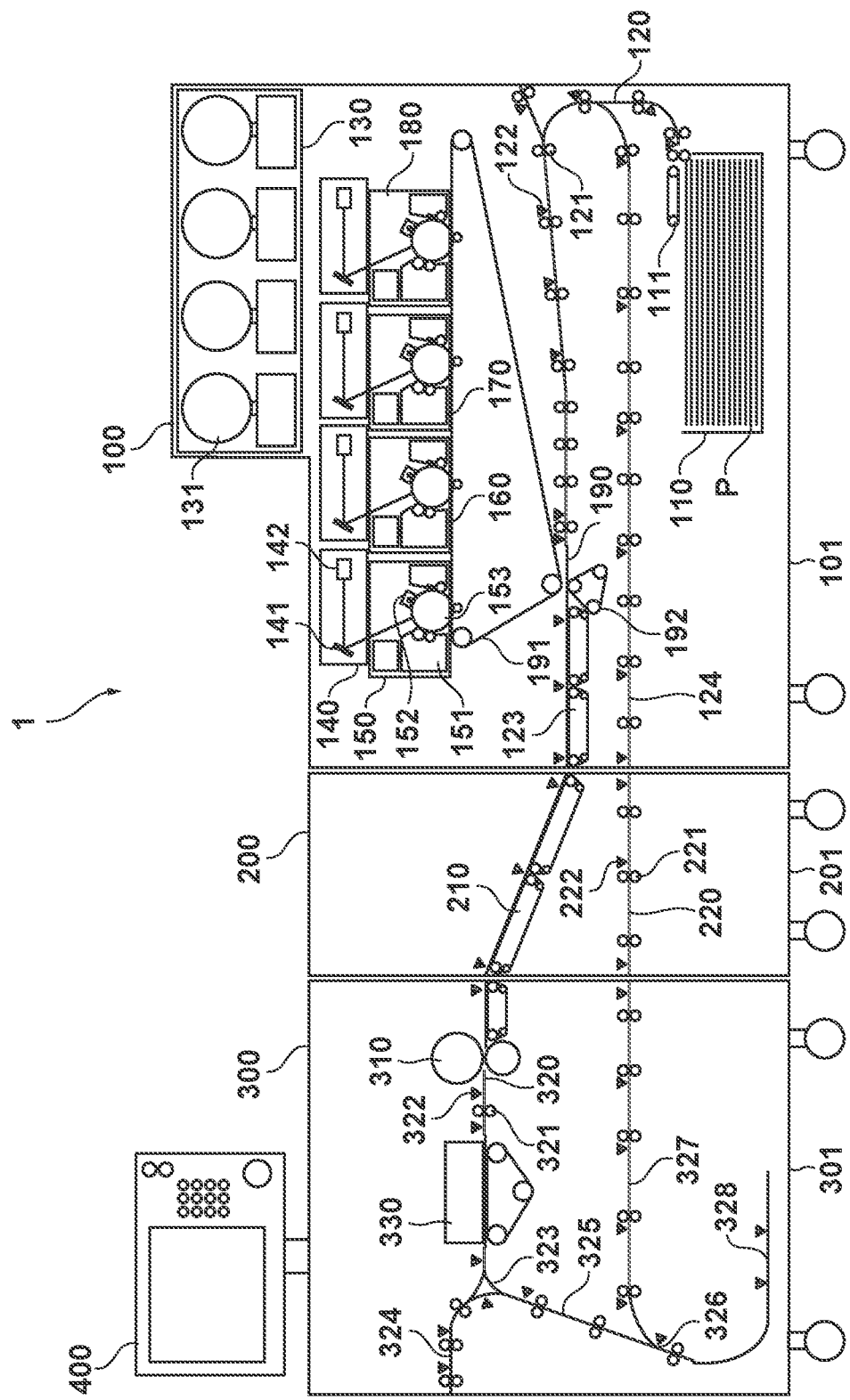
FIG. 1 is a view for describing an image forming apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<Image Forming Apparatus>

As illustrated in FIG. 1, a sheet-feed image forming unit 100 of an image forming apparatus 1 feeds and conveys a sheet P and transfers a toner image onto the sheet P. The sheet-feed image forming unit 100 has a housing 101. An intermediate conveying unit 200 is a device that conveys the sheet P discharged from the sheet-feed image forming unit 100 to a fixing and discharging unit 300. The intermediate conveying unit 200 has a housing 201. As illustrated in FIG. 1, the height of the discharging port of the sheet-feed image forming unit 100 is different from the height of the sheet receiving port of the fixing and discharging unit 300. In order to handle this height difference, an intermediate conveying unit 200 is provided. The fixing and discharging unit 300 is a device that fixes a toner image on the sheet P by applying heat and pressure to the sheet P discharged from the intermediate conveying unit 200 and discharges the sheet P. The fixing and discharging unit 300 has a housing 301. An operation unit 400 is a user interface including an output device for outputting information to a user and an input device for receiving information input by a user.

Sheet-Feed Image Forming Unit 100

A sheet cassette 110 is a container for storing a large number of sheets P. A sheet feeding mechanism 111 includes a feeding roller or the like for feeding the sheet P from the sheet cassette 110 to a conveyance path 120. A plurality of conveyance rollers 121 are disposed in the conveyance path 120. The plurality of conveyance rollers 121 are driven by an actuator (example: a motor) (not illustrated) to rotate, and convey the sheet P to a transfer unit 190. The image forming apparatus 1 monitors the position of the sheet P in the conveyance path 120 based on the detection result of path sensors 122 disposed in the conveyance path 120.

The sheet-feed image forming unit 100 includes four image forming stations (process units). An image forming station 150 forms a yellow toner image. An image forming station 160 forms a magenta toner image. An image forming station 170 forms a cyan toner image. An image forming station 180 forms a black toner image. Since the four image forming stations 150, 160, 170, and 180 each have the same or a similar structure, the structure of the image forming station 150 will now be described in detail.

A photosensitive drum 153 is an image carrier that rotates carrying an electrostatic latent image and a toner image. A charger 152 uniformly charges the surface of the photosensitive drum 153. A laser scanner 140 includes a light source (example: a semiconductor laser), a reflecting mirror 141, and a rotating polygon mirror 142 (not illustrated). The light source emits light corresponding to an image signal. The rotating polygonal mirror 142 reflects light while rotating. The reflecting mirror 141 reflects light incident from the rotating polygon mirror 142 toward the photosensitive drum 153. Thus, light is scanned on the photosensitive drum 153 and an electrostatic latent image is formed on the surface of the photosensitive drum 153. A developer 151 develops an electrostatic latent image with toner to form a toner image. A toner bottle unit 130 has a replaceable toner bottle 131 containing toner, and supplies toner to the developer 151.

Each of the four image forming stations 150, 160, 170, and 180 transfers a toner image onto an intermediate transfer member 191. The intermediate transfer member 191 conveys the toner image to the transfer unit 190 while rotating. In the transfer unit 190, a transfer belt 192 presses the sheet P against the intermediate transfer member 191. The toner image is transferred from the intermediate transfer member 191 to the sheet P. A conveyor belt 123 conveys the sheet P, to which the toner image is transferred, to the intermediate conveying unit 200.

A conveyance path 124 is used to convey the sheet P having the image formed on a first side thereof to the conveyance path 120 again (a double-sided image formation). That is, when an image is also formed on a second side of the sheet P, the conveyance path 124 feeds the sheet P into the transfer unit 190 again.

Intermediate Conveying Unit 200

A conveyor belt 210 conveys the sheet P discharged from the sheet-feed image forming unit 100 and discharges the sheet P to the fixing and discharging unit 300. Since the toner image is not fixed on the sheet P, the conveyor belt 210 may convey the sheet P using suction by negative pressure.

A conveyance path 220 conveys the sheet P from the fixing and discharging unit 300 to the sheet-feed image forming unit 100 in the double-sided image formation. A plurality of conveyance rollers 221 are disposed in the conveyance path 220. A plurality of path sensors 222 are disposed in the conveyance path 220. The intermediate conveying unit 200 and the sheet-feed image forming unit 100 monitor the position of the sheet P in the conveyance path 220 based on detection results of the path sensors 222.

Fixing and Discharging Unit 300

A fixing device 310 applies heat and pressure to the sheet P after it is discharged from the intermediate conveying unit 200 to fix the toner image on the sheet P. A conveyance roller 321 is disposed in a conveyance path 320. The conveyance roller 321 conveys the sheet P to a cooling device 330. The cooling device 330 cools the sheet P. The fixing and discharging unit 300 supports both face-up discharge and face-down discharge. Face-up discharge means discharging the sheet P so that the first side on which the image is formed faces upward. Face-down discharge means discharging the sheet P so that the first side on which the image is formed faces downward. When the face-up discharge is selected by the user, a switching unit 323 guides the sheet P to a conveyance path 324. As a result, the sheet P is discharged through the conveyance path 324. With the face-down discharge, the switching unit 323 guides the sheet P to a conveyance path 325. A switching unit 326 is provided at the lower end of the conveyance path 325. With the face-down discharge, the switching unit 326 guides the sheet P to a conveyance path 328. When the back end of the sheet P arrives at the conveyance path 325, the rotation direction of the conveyance roller provided in the conveyance paths 325 and 328 is reversed. Further, the switching unit 323 guides the sheet P from the conveyance path 325 to the conveyance path 324. In double-sided image formation, the rotation direction of the conveyance roller provided in the conveyance path 328 is reversed at a timing when the front end of the sheet P arrives at the conveyance path 328. Further, the switching unit 326 guides the sheet P from the conveyance path 328 to the conveyance path 327. The conveyance roller provided in the conveyance path 327 conveys the sheet P to the intermediate conveying unit 200. The conveyance paths 324, 325, 327, and 328 are also provided with path sensors for monitoring the position of the sheet P.

Controller

FIG. 2 illustrates a controller system for controlling the image forming apparatus 1. A main controller 10 is a control circuit for collectively controlling the entire image forming apparatus 1. The main controller 10 executes serial communication with the operation unit 400 to receive information input from the operation unit 400 or to transmit information to be output to the operation unit 400. The main controller 10 is connected to a main CPU 11 via a serial communication line. The serial communication line is only one example of a communication line and may be replaced by a wireless line.

The main CPU 11 is a control circuit for controlling feeding, conveying, image forming, fixing, and discharging of the sheet P. In the present embodiment, CPU is used as a generic term for a processor, a processing circuit, an IC (integrated circuit), or the like such as a central processing unit. Further, CPU may be understood as a computer having a core CPU unit, a memory unit (ROM and RAM), and a communication circuit. When the user operates the operation unit 400 to input a print job, the main controller 10 obtains job content from the operation unit 400 and transmits a job start instruction to the main CPU 11.

The main CPU 11 is connected to a plurality of sub CPUs 13a to 13g by serial communication lines. The main CPU 11 transmits control commands to the sub CPUs 13a to 13g by serial communication. Here, serial communication is a communication method in which the main device and the sub device communicate one-to-one, such as UART (asynchronous serial communication). At least two serial communication lines are connected between the main CPU 11 and the sub CPU 13a. For the serial communication line, the sub CPUs 13b to 13g are the same. The sub CPUs 13a to 13g are arranged inside the same functional unit (functional group) as the loads (actuators 16a to 16g, fans 15a to 15g, sensors 14a to 14g, etc.) to be controlled. This is to shorten the length of the cables connecting the sub CPUs 13a to 13g and the loads. To distinguish the components arranged in functional units 12a to 12g in FIG. 2, a to g are appended to the end of the reference numerals. When items common to each component are described, the letters a to g are omitted from the reference numerals. The functional unit 12 may be understood as a collection of loads controlled by one sub CPU 13. Further, the functional unit 12 may be understood as one divided region (space) when the image forming apparatus 1 is divided into a plurality of spaces for design convenience.

The sub CPU 13 transmits detection results of the sensor 14 to the main CPU 11. The sub CPU 13 also controls the fan 15 and the actuator 16 in accordance with commands received from the main CPU 11. The actuator 16 is a motor for driving a conveyance roller, and a solenoid for driving a flapper for switching the destination of the sheet P. The sensor 14 is a path sensor 122 or the like. Here, the sensor 14, the fan 15, and the actuator 16 are given as examples of loads, but these are only one example. The load may be, for example, an LED (light emitting diode) or the like. In FIG. 2, seven sub CPUs 13a to 13g are connected to one main CPU 11, but this is only one example. The technical idea of the present invention is applicable if two or more sub CPUs are connected to one main CPU 11.

Synchronous Actuator Control

FIG. 3 is a schematic cross-sectional view illustrating a conveyance path 120 of the sheet-feed image forming unit 100, a conveyance path 220 of the intermediate conveying unit 200, and a conveyance path 327 of the fixing and discharging unit 300. Conveyance rollers are disposed in the conveyance paths 120, 220, and 327, respectively. Each conveyance roller is driven by one of motors M1 to M18 connected by a broken line and rotates. The motors M1 to M4 are part of the actuator 16e. The motors M5 to M7 are part of the actuator 16d. The motors M8 to M10 are part of the actuator 16c. The motors M11 to M14 are part of the actuator 16b. The motors M15 to M18 are part of the actuator 16a.

Path sensors PS1 to PS18 are disposed in the conveyance paths 120, 220, and 327. Path sensors PS1 to PS18 are, for example, reflective photointerrupters whose output signal level differs depending on whether or not there is a sheet. Path sensors PS1 to PS5 are part of the sensor 14e. Path sensors PS6 to PS8 are part of the sensor 14d. Path sensors PS9 to PS12 are part of the sensor 14c. Path sensors PS13 to PS14 are part of the sensor 14b. Path sensors PS15 to PS18 are part of the sensor 14a. Since the motors M1 to M18g all rotate at the same rotational speed, the plurality of conveyance rollers do not pull the sheet P between them or press and curve the sheet P.

Incidentally, when double-sided printing is executed, a toner image density adjustment or transfer position adjustment may be executed in the image forming station 150. Temperature adjustment of the fixing device 310 may also be necessary during a print job. In the image forming apparatus 1, a sheet that has an image formed on a first side and that is conveyed to the transfer unit 190 in order that an image be formed on the second side thereof, and a sheet that is conveyed to the transfer unit 190 in order that an image be formed on the first side thereof may be conveyed alternately to the transfer unit 190. In these cases, a sheet P on which an image is formed on the first side but no image is formed on the second side must be stopped somewhere in the conveyance paths 120, 220, and 327 and wait. By a plurality of motors for driving a plurality of conveyance rollers for holding the sheet P decelerating and stopping in synchronization with each other, there is a reduction in the sheet P being bent into an accordion shape, being damaged, or the like. That is, damage to the sheet is suppressed. Therefore, in the following, a method of decelerating and stopping a plurality of motors synchronously (synchronous control) will be described in detail.

FIG. 4 illustrates a comparative example. In this comparative example, the motors M1 to M4 and the path sensors PS1 to PS5 are connected to the sub CPU 13e. The motors M5 to M7 and the path sensors PS6 to PS8 are connected to the sub CPU 13d. The motors M8 to M20 and the path sensors PS9 to PS12 are connected to the sub CPU 13c. The motors M11 to M14 and the path sensors PS13 to PS14 are connected to the sub CPU 13b. The motors M15 to M18 and the path sensors PS15 to PS18 are connected to the sub CPU 13a. The sub CPU 13a to sub CPU 13e are respectively connected to the main CPU 11 by serial communication lines 401a to 401e on a one-to-one basis. The main CPU 11 performs serial communication with the sub CPU 13a to the sub CPU 13e via the serial communication lines 401a to 401e.

FIG. 5A illustrates a state in which two conveyance rollers hold the sheet P when the sheet P is stopped with reference to the position of the path sensor PS13 in the comparative example. As illustrated in FIG. 5A, the sheet P is held by a conveyance roller driven by the motor M11 and a conveyance roller driven by the motor M12. The motors M11 and M12 are controlled by the sub CPU 13b.

Figure 6A:
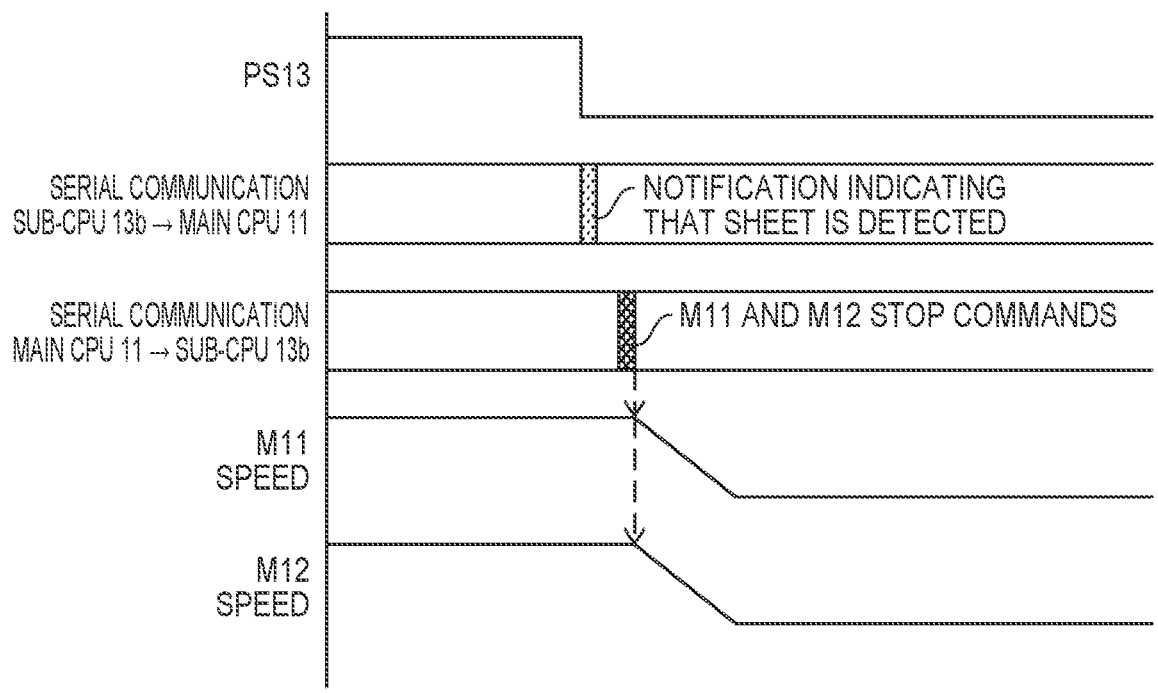
FIGS. 6A and 6B are timing charts for describing comparative examples.

As the FIG. 6A illustrates, when the path sensor PS13 detects the front end of the sheet P, the level of the output signal of the path sensor PS13 changes from a high level to a low level. In response to this change, the sub CPU 13b transmits a notification indicating that the front end of the sheet P has been detected to the main CPU 11 by serial communication. In response to this notification, the main CPU 11 transmits a stop command for stopping the motors M11 and M12 to the sub CPU 13b by serial communication. When the sub CPU 13b receives the stop command, the sub CPU 13b decelerates and stops the motors M11 and M12. When the stop command can be realized by one command, the deceleration start timing of the motor M11 and the deceleration start timing of the motor M12 are simultaneous. This is because the motors M11 and M12 are controlled by the sub CPU 13b (the same CPU).

FIG. 5B illustrates a state in which a plurality of conveyance rollers hold the sheet P when the sheet P is stopped with reference to the position of the path sensor PS10. As illustrated in FIG. 5B, the sheet P is held by a conveyance roller driven by the motor M7 and a conveyance roller driven to rotate by the motor M8. The motor M7 is controlled by the sub CPU 13d, while the motor M8 is controlled by the sub CPU 13c.

Figure 6B:
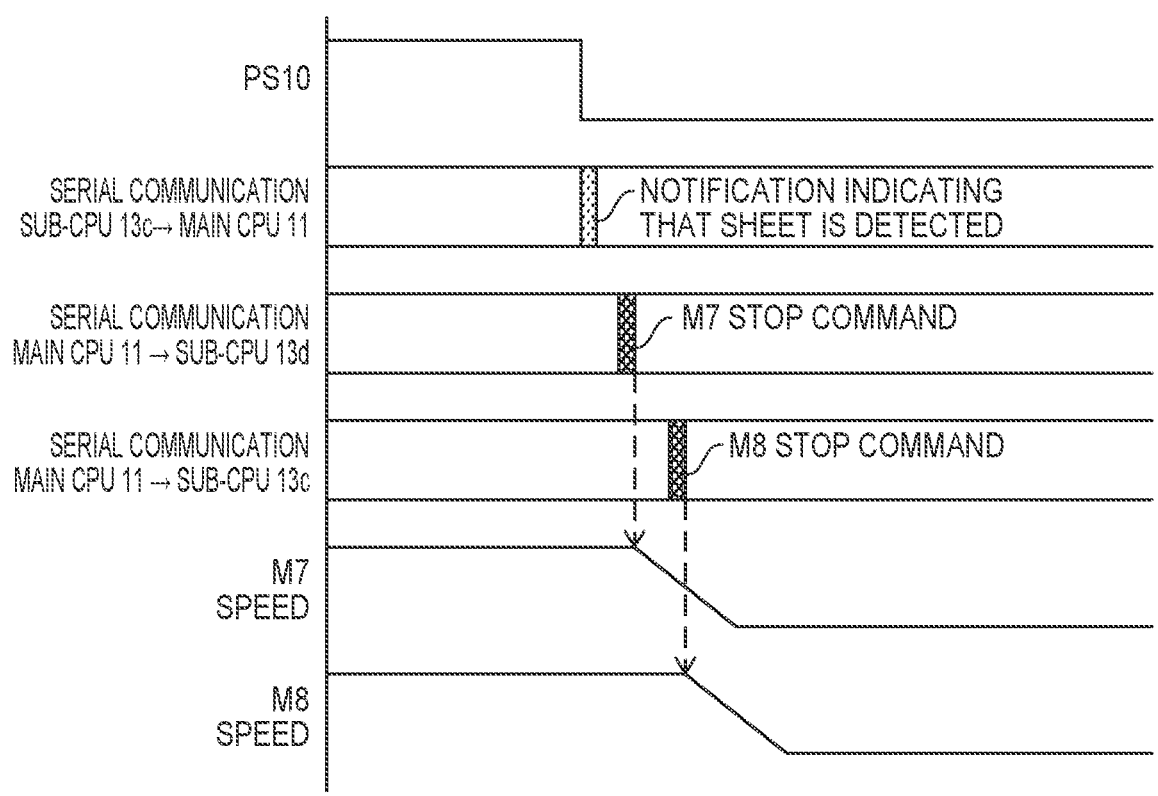

As the FIG. 6B illustrates, when the path sensor PS10 detects the front end of the sheet P, the level of the output signal of the path sensor PS10 changes from a high level to a low level. The sub CPU 13c transmits a notification indicating that the front end of the sheet P has been detected to the main CPU 11 by serial communication. The main CPU 11 cannot send commands to the sub CPU 13c and the sub CPU 13d at the same time. Accordingly, in response to this notification, the main CPU 11 transmits a stop command for stopping the motor M7 to the sub CPU 13d by serial communication. Next, the main CPU 11 transmits a stop command for stopping the motor M8 to the sub CPU 13c by serial communication. When the sub CPU 13d receives the stop command, the sub CPU 13d decelerates and stops the motor M7. Delayed from this, the sub CPU 13c receives the stop command, and then the sub CPU 13c decelerates and stops the motor M8. Thus, in conveyance of the sheet P, a conveyance roller driven by the motor M7 is stopped first and a conveyance roller driven to rotate by the motor M8 is stopped after. As a result, the two conveyance rollers pull the sheet P between them.

Thus, when the main CPU 11 transmits a stop command via serial communication to a plurality of sub CPUs, the control timing may deviate between the plurality of sub CPUs. As a result, a deviation in rotational speed occurs between a plurality of conveyance rollers that hold the sheet P, and the sheet P is bent in an accordion shape or is pulled and damaged.

First Embodiment

FIG. 7 illustrates the wiring of the synchronization signal line (shared signal line) in the first embodiment. Compared with FIG. 4, the following points are different in FIG. 7. A signal line 701b for transmitting the detection result of the path sensor PS13 is connected to the sub CPUs 13c, 13d and 13e in addition to the sub CPU 13b. Furthermore, a signal line 701c for transmitting the detection result of the path sensor PS10 is connected to the sub CPUs 13d and 13e in addition to the sub CPU 13c. A signal line 701d for transmitting the detection result of the path sensor PS7 is connected to the sub CPU 13e in addition to the sub CPU 13d. The signal lines 701b to 701d are lines for propagating a detection signal (synchronization signal) of a high level or a low level. Therefore, changes in the levels of signals outputted from the path sensors PS7, PS10, and PS13 arrive at a plurality of sub CPUs at the same time.

FIG. 8A illustrates a state in which a plurality of conveyance rollers hold the sheet P when the sheet P is stopped with reference to the position of the path sensor PS10. As illustrated in FIG. 8A, the sheet P is held by a plurality of conveyance rollers driven by motors M2, M3, M4, M5, M6, M7, and M8, respectively. Therefore, the motors M2, M3, M4, M5, M6, M7, and M8 need to decelerate and stop in synchronization with each other. As illustrated in FIG. 7, the motors M2, M3, and M4 are controlled by the sub CPU 13e. The motors M5, M6, and M7 are controlled by the sub CPU 13d. The motor M8 is controlled by the sub CPU 13c. The path sensor PS10 is connected to the sub CPUs 13e, 13d and 13c by a shared signal line 701c. Instead of transmitting a control start command by serial communication, the main CPU 11 transmits a command to the sub CPUs 13c, 13d, and 13e to "decelerate and stop the actuator in synchronization with signals outputted from the path sensor PS10". This command is transmitted prior to the front end of the sheet P reaching the path sensor PS10. The sub CPUs 13c, 13d, and 13e, when receiving this instruction, recognize which path sensor output signal they should synchronize with to execute the instruction. That is, this instruction includes that the actuator should stop and identification information of the path sensor that will output an output signal that is the target of synchronization. For example, the instruction may include identification information specifying the content of the instruction and identification information specifying the path sensor. The instruction content and the identification information of the path sensor may be transmitted and received separately. The identification information of the path sensor may be the identification information of the input terminal or the input port to which the signal outputted from the path sensor is to be inputted.

Figure 9A:
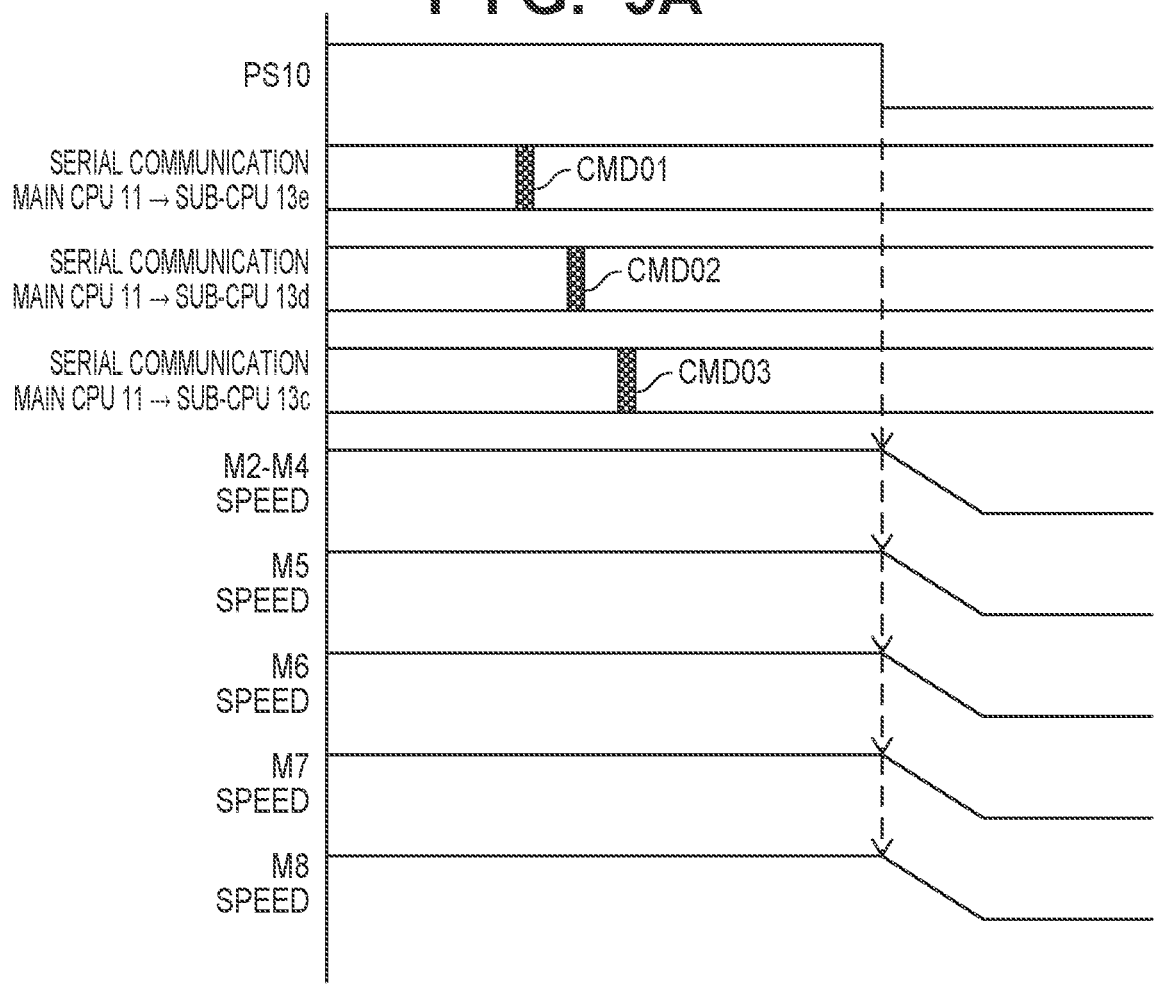
FIGS. 9A and 9B are timing charts for describing examples.

As illustrated in FIG. 9A, when the sub CPU 13e receives the command CMD01, the sub CPU 13e starts stop control of the motors M2, M3, and M4 in synchronization with the timing at which the path sensor PS10 detects the front end of the sheet P. For example, the instruction CMD01 may include identification information of the path sensor PS10 and identification information of the motors M2, M3, and M4. When the sub CPU 13d receives the command CMD02, the sub CPU 13d starts stop control of the motors M5 to M7 in synchronization with the timing at which the path sensor PS10 detects the front end of the sheet P. For example, the instruction CMD02 may include identification information of the path sensor PS10 and identification information of the motors M5 to M7. When the sub CPU 13c receives the command CMD03, the sub CPU 13c starts stop control of the motor M8 in synchronization with the timing at which the path sensor PS10 detects the front end of the sheet P. For example, the instruction CMD03 may include identification information of the path sensor PS10 and identification information of the motor M8. As a result, the deviation of the deceleration start timing between the plurality of sub CPUs is greatly reduced.

When a sheet P having a long length in the conveyance direction is stopped as in the case illustrated in FIG. 8A, the actuators to be stopped are the motors M2 to M8. However, when stopping the sheet P having a short length in the conveyance direction, it is not necessary to stop all of the motors M2 to M8. For example, in the case illustrated in FIG. 8B, it is enough if the motor M7 and the motor M8 are stopped. Therefore, the main CPU 11 selects the motor to be controlled based on the size of the sheet P to be stopped (length in the conveyance direction) and the path sensor (reference sensor) to be used as a reference. Here, the reason for considering the path sensor is that depending on the path sensor that outputs the synchronization signal, the motors to be stopped, and the sub CPUs for controlling those motors differ. In the case of FIG. 8B, the sheet P is stopped with reference to the position of the path sensor PS10. Therefore, the motors driving the conveyance roller holding the sheet P are the motors M7 and M8. Further, the sub CPUs that are to receive the instruction are the sub CPUs 13c and 13d. Comparing FIG. 8A and FIG. 8B, it can be understood that even if the path sensor serving as a reference is the same, the motors to be controlled and the sub CPUs to be the destination of the command differ depending on the size of the sheets P.

The main CPU 11 can recognize the length of the sheet P by obtaining the sheet size information input by the user through the operation unit 400 from the main controller 10. When the conveyance of the sheet P needs to be stopped, the main CPU 11 selects the actuators to be stopped in accordance with the sheet size information. This causes the appropriate actuator to decelerate and stop according to the sheet size. In the first embodiment, the sheet size information is inputted by the user, but this is only an example. For example, the main CPU 11 may obtain sheet size information by using a sheet sensor that detects the size of the sheets P accommodated in the sheet cassette 110.

Figure 9B:
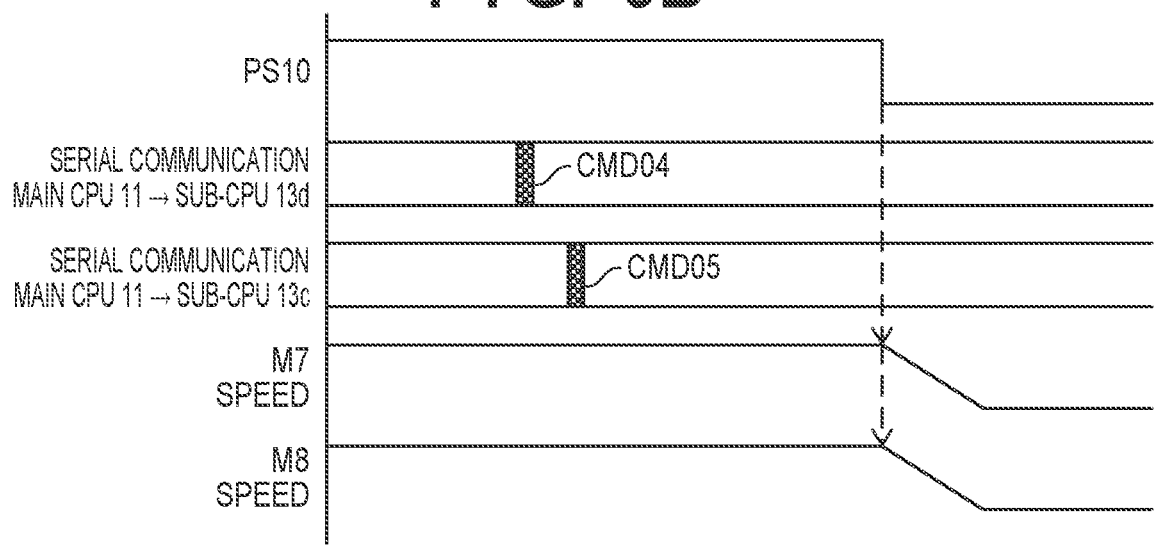

As illustrated by FIG. 9B which corresponds to FIG. 8B, the main CPU 11 transmits instruction CMD04 to the sub CPU 13d. For example, the instruction CMD04 may include identification information of the path sensor PS10 and identification information of the motor M7. The sub CPU 13d, based on the command CMD04, stops the motor M7 in synchronization with the timing at which the output signal of the path sensor PS10 changes. Similarly, the main CPU 11 sends instruction CMD05 to the sub CPU 13c. The instruction CMD05 includes identification information of the path sensor PS10 and identification information of the motor M8. The sub CPU 13c, based on the command CMD05, stops the motor M8 in synchronization with the timing at which the output signal of the path sensor PS10 changes.

FIG. 10 illustrates a motor to be subjected to synchronization control determined from a sheet length L and the reference sensor, and a sub CPU to be a destination of a command for synchronization control. The reference sensor is a path sensor for outputting a synchronization signal as a reference when stopping the sheet P. The main CPU 11 holds a matrix illustrated in FIG. 10 in a storage device such as a ROM. The main CPU 11 determines the motor to be decelerated and stopped by referring to the matrix based on the sheet size information (sheet length L) and the reference sensor. For example, there are cases where the sheet length L is 700 mm and the reference sensor is a path sensor PS7. In this instance, the main CPU 11 identifies the motors M2, M3, M4, M5, and M6 as control targets by referring to the matrix based on this information. That is, the main CPU 11 transmits to the sub CPU 13e by a serial communication a stop command in which the reference sensor is the path sensor PS7 and the motors M2, M3, and M4 are the control targets. Also, the main CPU 11 transmits to the sub CPU 13d by serial communication a stop command in which the reference sensor is the path sensor PS7 and the motors M5 and M6 are the control targets. Thus, the instruction CMD may specify the control content (example: stop/drive), the reference sensor (example: path sensor PS10) and the control target (example: motor M5). In particular, if control targets are specified, the sub CPU 13 will be able to stop or drive the minimum number of required actuators.

Method of Determining the Reference Sensor

The reference sensor may be any of the path sensors present downstream in the conveyance direction from the position of the front end of the sheet P at the timing when the stop of the sheet P is required. It is assumed that it is determined that it is necessary to stop the sheet P at a time ta. Timing at which the front end of the sheet P arrives at the downstream path sensor is a time tz. The timing (time tm) at which the main CPU 11 completes the setting of deceleration and stoppage for the sub CPU 13 must be earlier than time tz. Here, the duration from the time ta to the time tm is T0. Time T0 includes the time required for serial communication. The main CPU 11 determines a path sensor satisfying this condition as a reference sensor.

In addition, the reference sensor must be a path sensor connected to the sub CPU 13 that is to perform the deceleration and stoppage. For example, assume that the path sensors PS13 and PS14 are present downstream of the front end of the sheet P. According to FIG. 7, the sub CPU to which the path sensor PS14 is connected is the sub CPU 13b. Therefore, the motors M11, M12, M13, and M14, with the path sensor PS14 as a reference sensor, can be controlled by the sub CPU 13b. On the other hand, the path sensor PS14 is not connected to the sub CPUs 13e, 13d, or 13c. Therefore, the motors M1 to M10, which are controlled by the sub CPUs 13e, 13d, and 13c, are not controllable using the path sensor PS14 as a reference sensor. Therefore, the main CPU 11 determines the path sensor PS13 as the reference sensor in order to make the motors M1 to M10 also a deceleration/stoppage target. This is because the path sensor PS13 is connected to the sub CPUs 13e, 13d and 13c by the signal line 701b.

Flowchart

Figure 11A:
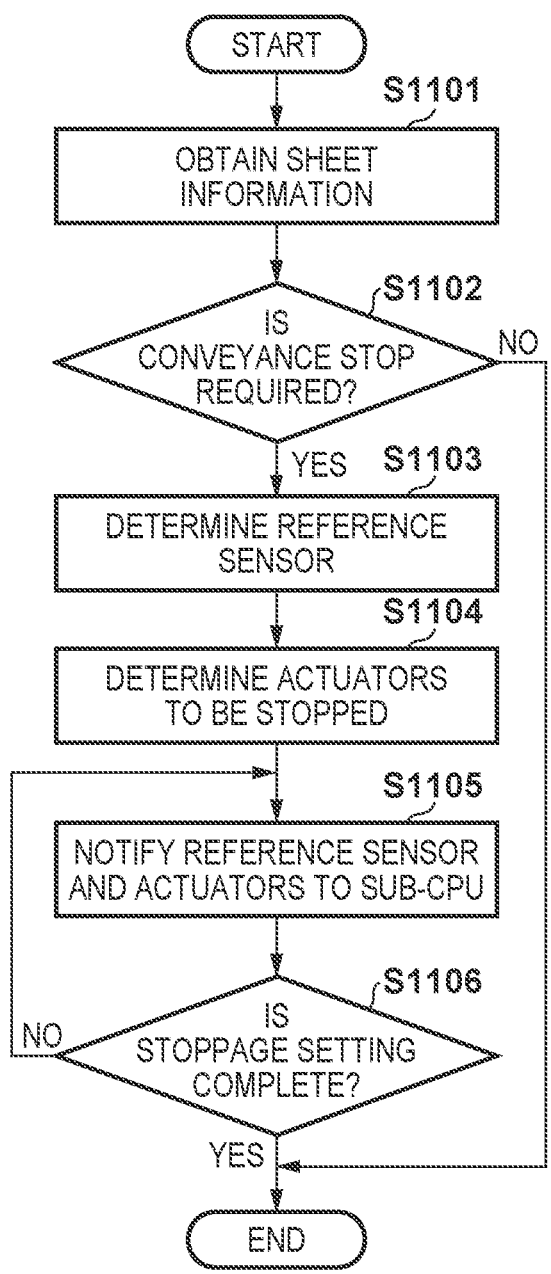
FIGS. 11A and 11B are flowcharts for describing a stop control method.

FIG. 11A illustrates deceleration stop control of a plurality of actuators executed by the main CPU 11. In step S1101, the main CPU 11 obtains the sheet size information. Sheet size information is obtained, for example, when a job is started or while a job is executing. The sheet size information is obtained from the operation unit 400 or the host computer through the main controller 10.

In step S1102, the main CPU 11 determines whether or not the conveyance of the sheet P needs to be stopped. For example, it may be necessary to adjust the temperature of the fixing device 310 while the job is being executed. It may be necessary to adjust the transfer position of the toner image with respect to the sheet P or adjust the density of the toner image. In such cases, the main CPU 11 determines whether or not the conveyance of the sheet P needs to be stopped. When the stoppage of conveyance of the sheet P is not required, the main CPU 11 ends the deceleration stop control. When the stoppage of conveyance of the sheet P is required, the main CPU 11 advances the processing to step S1103.

In step S1103, the main CPU 11 determines the reference sensor based on the front end position of the sheet P being conveyed in the conveyance path of the image forming apparatus 1 at that point and the conveyance speed of the sheet P. As described above, any of the path sensors located downstream of the front end of the sheet P in the conveyance direction is selected as the reference sensor. For example, the path sensor closest to the front end position of the sheet P may be selected as the reference sensor. The reason that the conveyance speed is considered is that it is necessary that the sheet P be detected by the reference sensor when the sheet P stops. Thus, when the sheet P is stopped, path sensors that the back end of the sheet P will end up passing are excluded from the reference sensor. Incidentally, by multiplying the conveyance speed with the elapsed time from the time when the front end of the sheet P passes a certain path sensor, the movement distance of the sheet P is calculated. In other words, it can be seen that the sheet P will be present at a position that is the movement distance away from the detection position of the path sensor. In this manner, the conveyance speed is also used to specify the position of the sheet P.

In step S1104, the main CPU 11 determines the actuators (motors) to be stopped based on the combination of the sheet size information and the reference sensor. For example, the main CPU 11 may select a motor corresponding to a combination of the sheet size information and the reference sensor by referring to the matrix (control table) illustrated in FIG. 10.

In step S1105, the main CPU 11 notifies the reference sensor and the actuators to be stopped by serial communication to the sub CPUs 13 which control the actuators to be stopped. For example, the main CPU 11 refers to the matrix illustrated in FIG. 10, and determines the sub CPUs controlling the actuators to be stopped. The determined sub CPUs are the destination of the stop notification (stop command). The notification may include identification information of the actuator to be stopped and identification information of the reference sensor. The identification information of the reference sensor may be the identification information of the shared signal line connected to the reference sensor or the identification information of the input port to which the shared signal line is connected.

In step S1106, the main CPU 11 determines whether or not the stoppage setting has completed. For example, the main CPU 11 may determine whether a response to a stoppage notification has been received by serial communication from all sub CPUs 13 determined as destinations of the stoppage notification. When all the sub CPUs 13 selected as destinations have completed the stoppage setting, the main CPU 11 terminates the deceleration stop control.

Figure 11B:
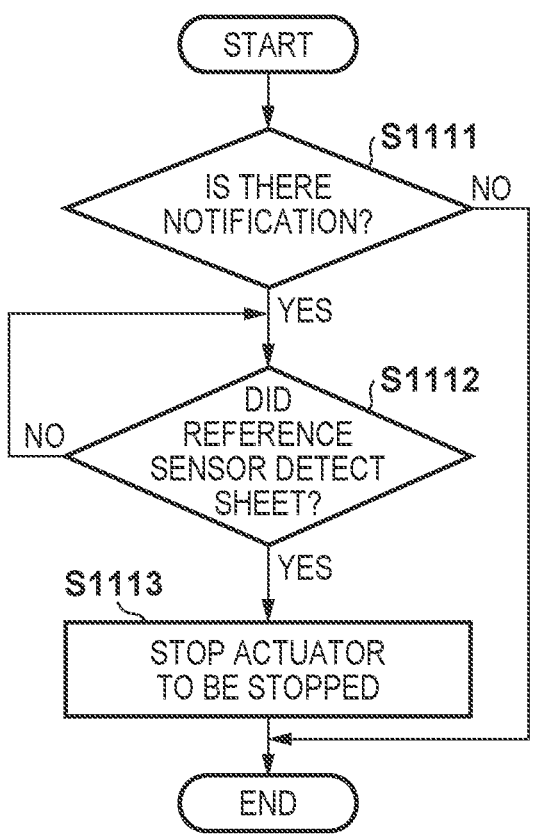

FIG. 11B illustrates deceleration stop control executed by the sub CPU 13. In step S1111, the sub CPU 13 determines whether or not there is a notification (stop command) regarding the deceleration stop control (synchronization control) transmitted from the main CPU 11. If the notification is not received by serial communication, the sub CPU 13 ends the deceleration stop control. If the notification is received by serial communication, the sub CPU 13 advances the processing to step S1112.

In step S1112, the sub CPU 13 determines whether or not the reference sensor specified by the notification detected the sheet P. For example, a notification determines whether the level of the detection signal of the shared signal line connected to the specified reference sensor has changed. When the reference sensor detects the sheet P, the sub CPU 13 advances the process to step S1113.

In step S1113, the sub CPU 13 stops the actuator specified by the notification. As a result, the conveyance of the sheet P is stopped.

In the first embodiment, the times at which the stop commands are transmitted to the plurality of sub CPUs 13 are staggered, but the timings at which the sub CPUs stop the respective actuators to be stopped are synchronized. This is because each of the sub CPUs stops the actuator to be stopped with reference to a timing at which a single reference sensor connected by a shared signal line detects the sheet P. Thus, pulling of the sheet P or bending of the sheet P is less likely to occur than conventionally. That is, damage to the sheet is suppressed. Further, by changing the target of synchronous control in accordance with the length of the sheet in the conveyance direction, it is possible to suppress a decrease in productivity of the image forming apparatus.

Second Embodiment

In the first embodiment, the case where the conveyance of the sheet P is stopped has been described. In the second embodiment, a case where the conveyance of a sheet P is restarted (re-feeding) will be described.

Figure 12A:
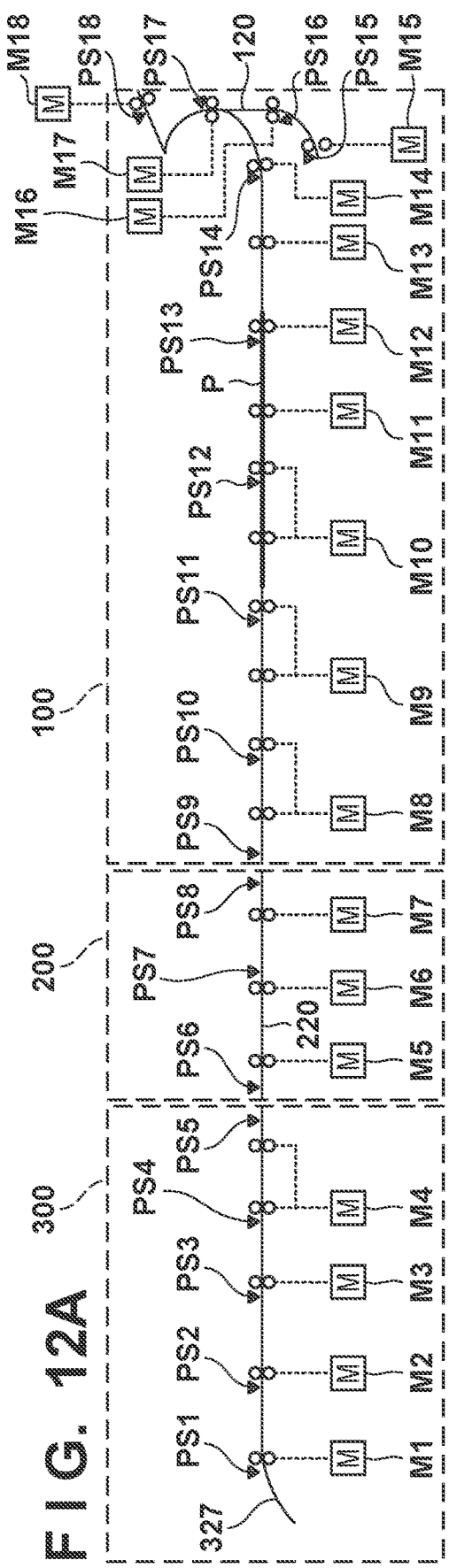
FIGS. 12A and 12B are views for describing a restart of conveyance of a sheet.

FIG. 12A illustrates a state in which the conveyance of a sheet P is stopped using the path sensor PS13 as a reference sensor. The sheet P is held by a conveyance roller driven by the motor M10, a conveyance roller driven by the motor M11, and a conveyance roller driven by the motor M12. The sheet P may be re-fed to resume printing on the sheet P. In this case, the motors M10, M11, and M12 must be accelerated synchronously.

Figure 13:
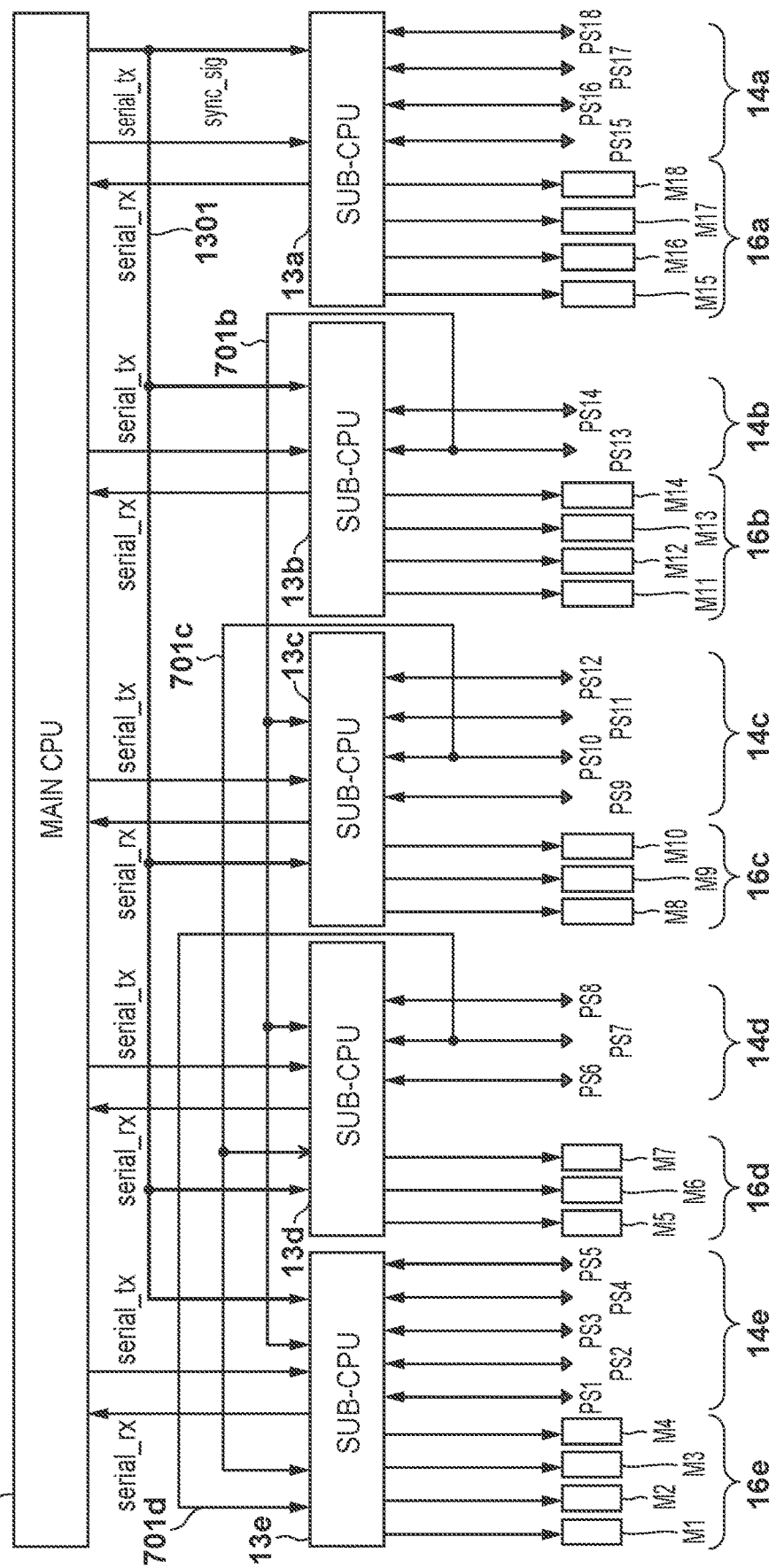
FIG. 13 is a view for describing a shared signal line.

FIG. 13 illustrates the wiring of a synchronization signal line 1301 in the second embodiment. The synchronization signal line 1301 is added in FIG. 13 as compared with FIG. 7. The synchronization signal line 1301 connects the main CPU 11 to the sub CPUs 13a to 13e, and conveys a synchronization signal sync_sig. The synchronization signal sync_sig is a signal that switches to either a high level or a low level.

Figure 14A:
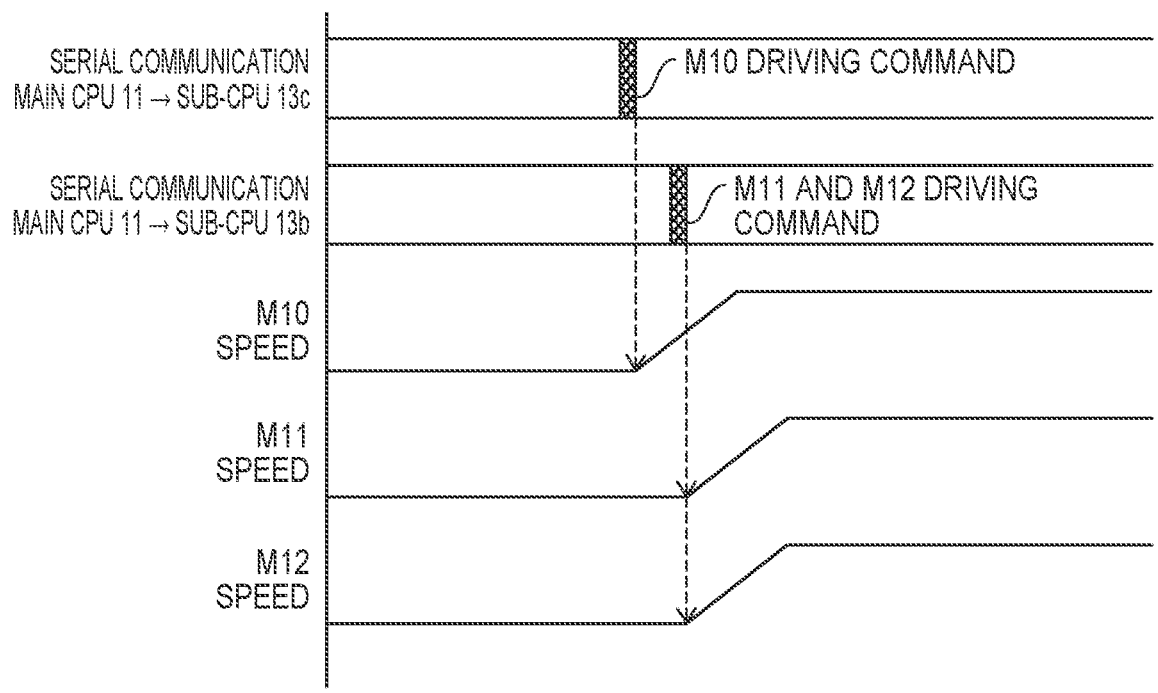
FIGS. 14A and 14B are timing charts for describing a re-driving of an actuator.

FIG. 14A illustrates the re-driving of the motors M10 to M12 in a comparative example. In the comparative example, the timing of the re-driving is determined by the driving command transmitted by the serial communication. That is, the timing at which the drive command arrives is the re-drive timing. As described above, in serial communication, main CPU 11 cannot send instructions to each sub CPU 13 simultaneously. Therefore, the sub CPU 13b receives a drive command after the sub CPU 13c. As a result, the motors M11 and M12 start to accelerate later than the motor M10. As illustrated in FIG. 12A, the conveyance rollers of the motors M11 and M12 are positioned downstream of the conveyance rollers of the motor M10. Therefore, pulling of the sheet P occurs.

In the second embodiment, the main CPU 11 transmits the command CMD to the sub CPU 13c and the sub CPU 13b by serial communication and switches the level of the synchronization signal line 1301. The command CMD includes the command content (to restart driving) and the identification information of the synchronization signal. The command CMD may include identification information specifying a control target actuator. The identification information may be referred to as designation information.

Figure 14B:
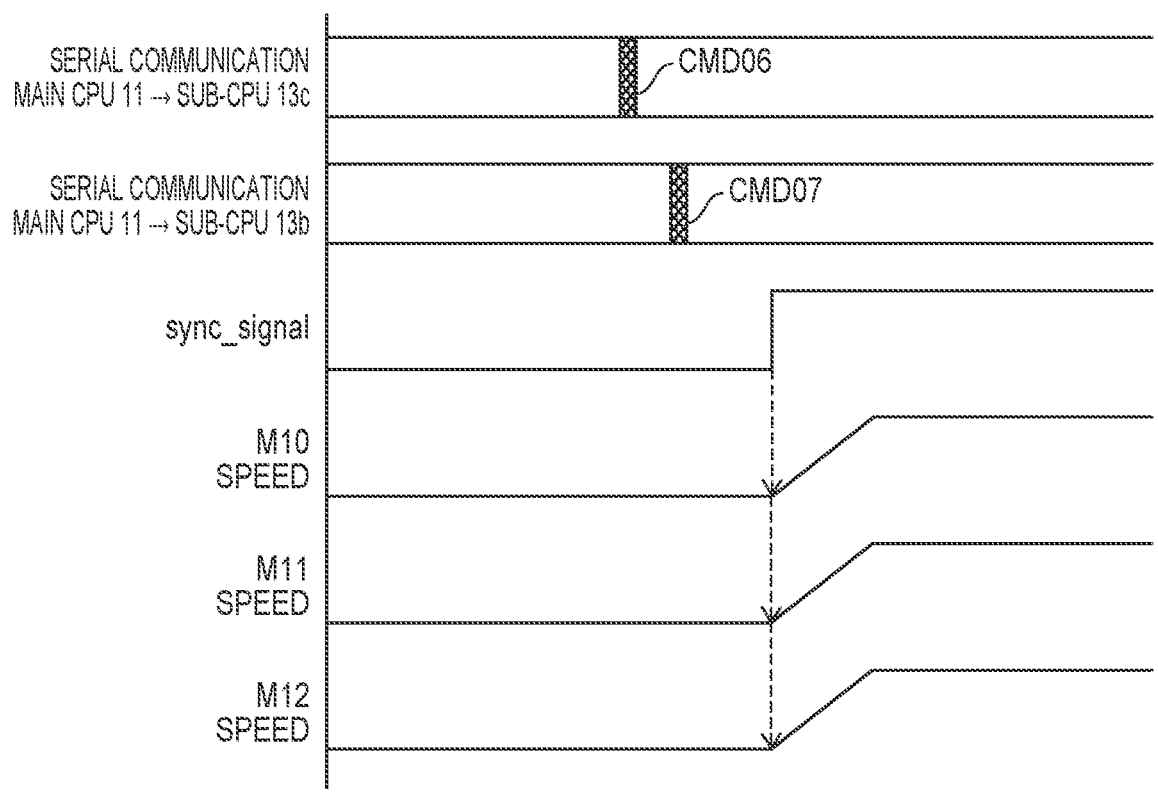

As illustrated in FIG. 14B, the main CPU 11 transmits the command CMD06 of the motor M10 to the sub CPU 13c by serial communication. The command CMD06 is a command for instructing that the motor M10 should be driven in synchronization with the synchronization signal sync_sig of the synchronization signal line 1301. After that, the main CPU 11 transmits the command CMD07 of the motors M11 and M12 to the sub CPU 13b by serial communication. The command CMD07 is a command for instructing that the motors M11 and M12 should be driven in synchronization with the synchronization signal sync sig of the synchronization signal line 1301. Thereafter, the main CPU 11 inverts the level of the synchronization signal sync sig of the synchronization signal line 1301. The sub CPU 13c restarts the driving of the motor M10 in synchronization with the timing of the change in the level of the synchronization signal sync sig. The sub CPU 13b restarts the driving of the motors M11 and M12 in synchronization with the timing of the change in the level of the synchronization signal sync sig.

Thus, the main CPU 11 instructs the driving timing of the actuator by the synchronization signal line 1301 which is a shared signal line. As a result, the deviation of the driving timing between the plurality of sub CPUs is greatly reduced.

Incidentally, when only one sheet P is stopped in the conveyance path as illustrated in FIG. 12A, re-feeding of the sheet P is realized by re-driving only the motors M10, M11, and M12. When the motors M1 to M9 are driven, wasteful power is consumed. Therefore, also in the second embodiment, the main CPU 11 may determine the actuators to be re-driven based on the sheet size information and the sheet position. In the second embodiment, similarly to the first embodiment, a matrix in which actuators corresponding to combinations of sheet size information and the sheet position are registered is stored in a memory such as a ROM, and may be referred to by the main CPU 11. As a result, since unnecessary actuators are not activated, the sheet P can be re-fed with minimal power.

Figure 12B:
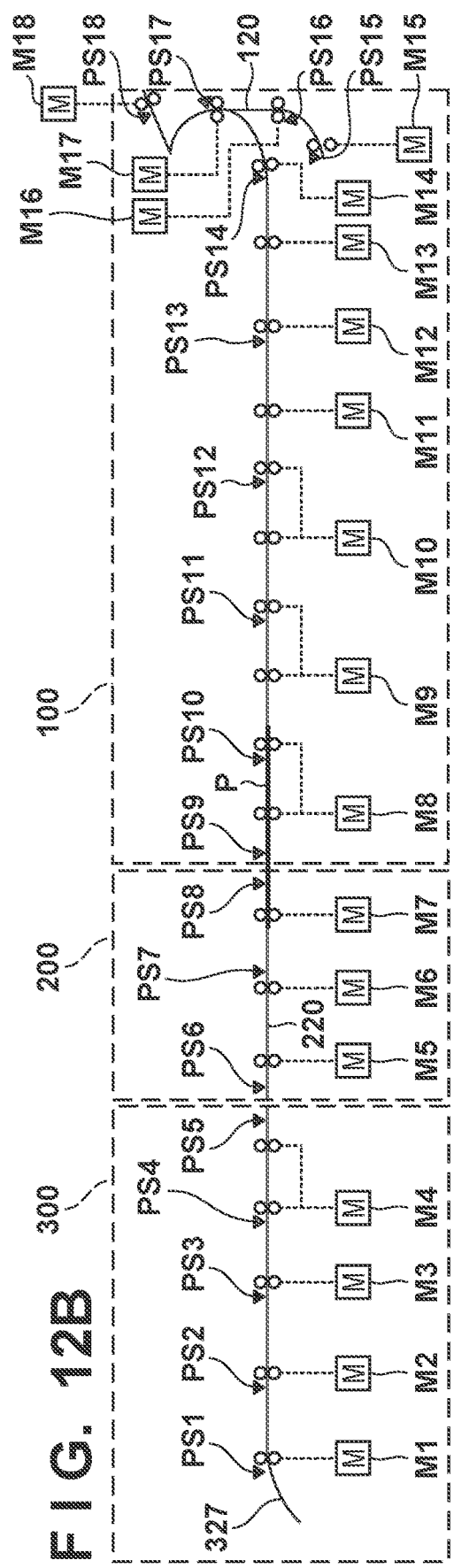

For example, the sheet P may be stopped at the position illustrated by FIG. 12B. When the sheet P is re-fed, the main CPU 11 transmits a command CMD for driving the motor M7 to the sub CPU 13d in synchronization with the synchronization signal sync_sig. Furthermore, the main CPU 11 transmits a command CMD for driving the motor M8 to the sub CPU 13c in synchronization with the synchronization signal sync_sig. Thereafter, the main CPU 11 inverts the level of the synchronization signal sync_sig applied to the synchronization signal line 1301.

In the second embodiment, it is assumed that the synchronization signal sync_sig is a timing signal (reference signal) outputted by the main CPU 11. However, the synchronization signal sync_sig may be outputted from any sub CPU 13. Alternatively, the synchronization signal sync_sig may be a detection signal outputted from any of the path sensors. For example, when a temperature adjustment or the like of the fixing device 310 is completed, the printing operation is resumed. After a sheet P is newly fed from the sheet cassette 110, a sheet P stopped in the conveyance path may be re-fed. In this case, the detection signal outputted by the path sensor PS17 illustrated in FIG. 12A may be used as a synchronization signal sync_sig. That is, the synchronization signal line 1301 may be connected to the output terminal of the path sensor PS17. In this case, by the sheet P passing by the path sensor PS17, the level of the synchronization signal sync_sig is inverted. The sub CPU 13 restarts the driving of the actuator in synchronization with the reversal timing.

Flowchart

Figure 15A:
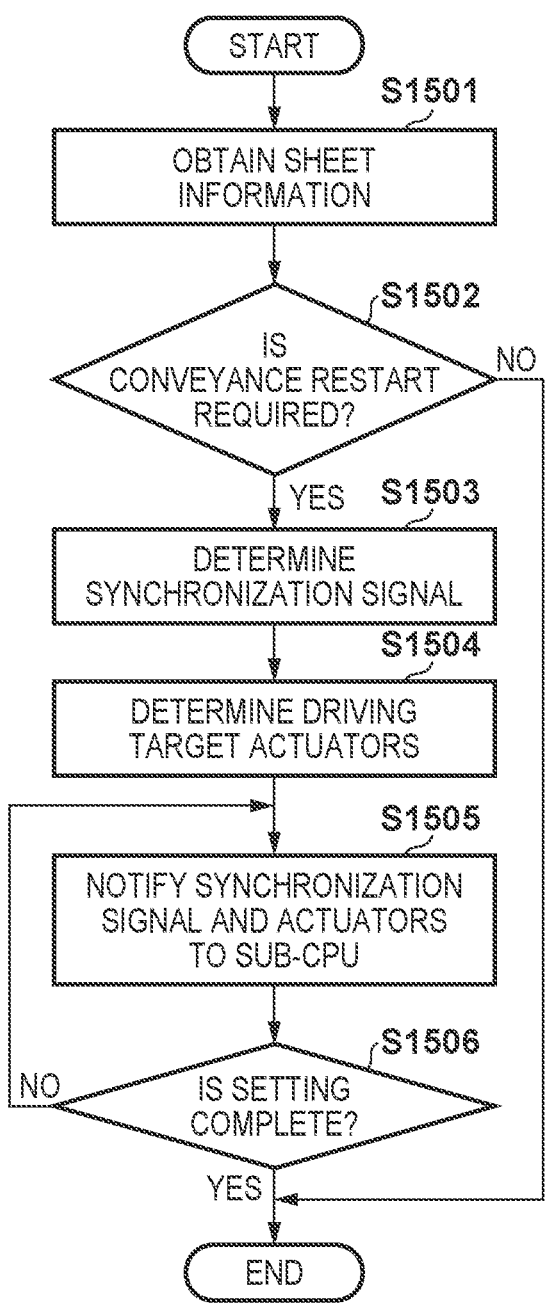
FIGS. 15A and 15B are flowcharts for describing a conveyance restart method.

FIG. 15A illustrates control for restarting driving of a plurality of actuators executed by the main CPU 11. In step S1501, the main CPU 11 obtains sheet size information when the job is started or while the job is executing. The sheet size information is obtained from the operation unit 400 or the host computer through the main controller 10.

In step S1502, the main CPU 11 determines whether or not the conveyance of the sheet P needs to be restarted. For example, completion of the temperature adjustment of the fixing device 310, adjustment of the transfer position of the toner image with respect to the sheet P, or adjustment of the density of the toner image, or the like means that the conveyance restart condition is satisfied. If the conveyance restart condition is not met, the main CPU 11 terminates the drive restart control. When the restart of conveyance of the sheet P is required, the main CPU 11 advances the processing to step S1503.

In step S1503, the main CPU 11 determines a synchronization signal indicating the drive restart timing. In this example, the synchronizing signal (reference signal) is determined to the synchronizing signal sync sig of the synchronization signal line 1301.

In step S1504, the main CPU 11 determines the actuators (motors) to be driven based on the combination of the sheet size information and the position of the sheet P of the conveyance restart target. For example, the main CPU 11 may select a motor corresponding to a combination of the sheet size information and the position of the sheet P by referring to the matrix (control table) stored in the ROM.

In step S1505, the main CPU 11 notifies synchronization signal and the actuators to be driven by serial communication to the sub CPUs 13 which controls the actuators to be driven. For example, the main CPU 11 may refer to the matrix, and determine the sub CPUs controlling the actuators to be driven. The determined sub CPUs are the destinations of the drive notification (drive command). The notification (command CMD) may include identification information of the actuator to be driven and identification information of the synchronization signal. The identification information of the synchronization signal may be the identification information of the shared signal line to which the synchronization signal is applied or the identification information of the input port to which the shared signal line is connected.

In step S1506, the main CPU 11 determines whether or not the setting has completed. For example, the main CPU 11 may determine whether a response to a drive notification has been received by serial communication from all sub CPUs 13 determined as destinations of the drive notification. When all the sub CPUs 13 selected as destinations have completed the setting, the main CPU 11 terminates the drive restart control.

Figure 15B:
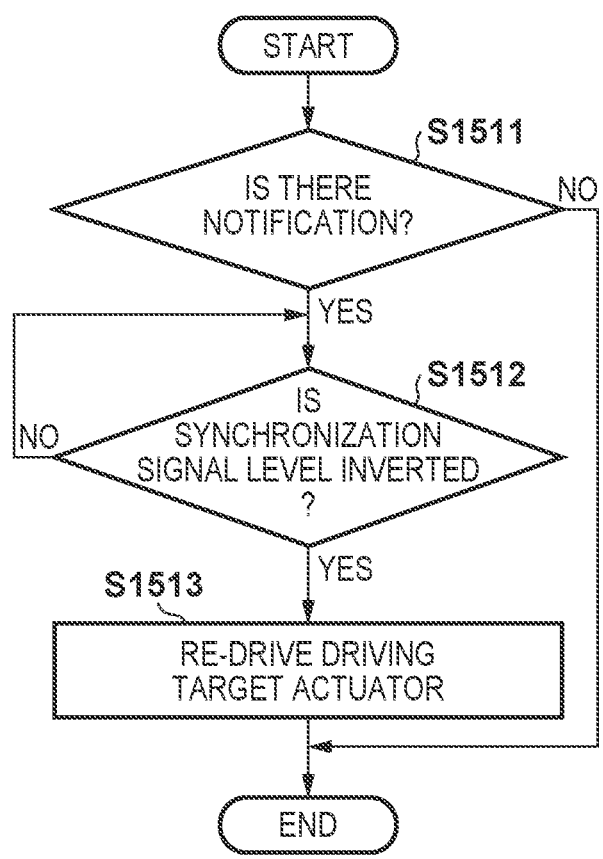

FIG. 15B illustrates drive restart control executed by the sub CPU 13. In step S1511, the sub CPU 13 determines whether or not there is a notification (command CMD) regarding the drive restart control (synchronization control) transmitted from the main CPU 11. If the notification is not received by serial communication, the sub CPU 13 ends the drive restart control. If the notification is not received by serial communication, the sub CPU 13 advances the processing to step S1512.

In step S1512, the sub CPU 13 determines whether or not the level of the synchronizing signal (reference signal) specified by the notification was inverted. For example, it is determined whether or not the level of the synchronization signal sync_sig of the synchronization signal line 1301 specified by the notification has changed. When the level of the synchronization signal sync_sig was inverted, the sub CPU 13 advances the process to step S1513.

In step S1513, the sub CPU 13 re-drives the drive-target actuator specified by the notification. As a result, the conveyance of the sheet P is re-started.

Third Embodiment

Figure 16A:
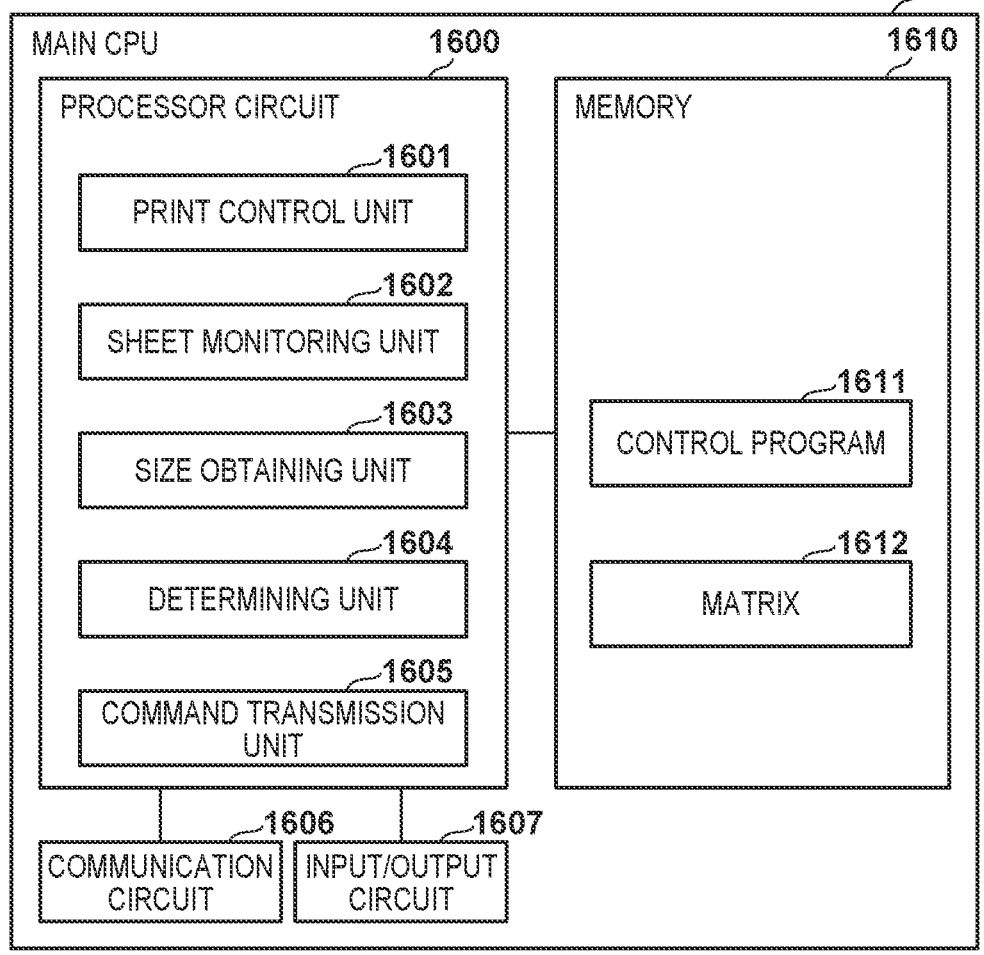
FIGS. 16A and 16B are views for describing a CPU.

FIG. 16A is a diagram illustrating an internal configuration of a main CPU 11. The processor circuit 1600 realizes various functions by executing a control program 1611 stored in the ROM region of the memory 1610. A print control unit 1601 controls each unit of the image forming apparatus 1 according to an instruction from the main controller 10. For example, the print control unit 1601 may control the image forming apparatus 1 to perform various adjustments described above. A sheet monitoring unit 1602, based on a detection result of a plurality of path sensors PS connected to the input/output circuit 1607 and an arrangement position of each path sensor PS in the conveyance path, and a conveyance speed of the sheet P, monitors the conveyance position of the sheet P in the conveyance path or the like. A size obtaining unit 1603 obtains the sheet length L of the sheet P from the main controller 10 or the like. A determining unit 1604, for example, based on the sheet length L and the conveyance position of the sheet P, determines a reference sensor from among a plurality of path sensors PS. A matrix 1612 may be used for this determination. For example, the matrix 1612 may hold the reference sensor (example: identification information of the path sensor Pi) corresponding to a combination of the sheet length L and the conveyance position of the sheet P. The determining unit 1604 may further determine an actuator to be controlled and a sub CPU 13 to control the actuator based on a combination of the sheet length L and the reference sensor. As described with reference to FIG. 10, the determining unit 1604 may determine a control target and a destination of a command by referring to the matrix 1612 stored in the memory 1610. The command transmission unit 1605 creates a command including control contents (example: conveyance stop/conveyance restart) set by the print control unit 1601 and a reference sensor determined by the determining unit 1604. The command transmission unit 1605 transmits a command to the sub CPU 13, which is a destination, through the communication circuit 1606. The communication circuit 1606 is a circuit that is connected to the sub CPU 13 via the communication line 401, and executes serial communication. An input/output circuit 1607 includes an output circuit for outputting a synchronizing signal sync sig to the synchronization signal line 1301.

Figure 16B:
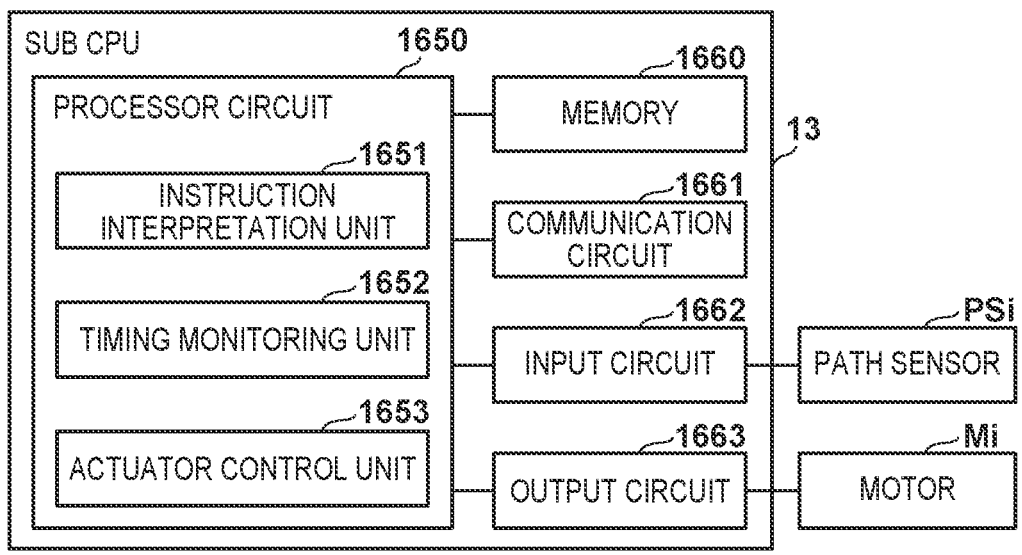

FIG. 16B is a diagram illustrating an internal configuration of a sub CPU 13. The processor circuit 1650 realizes various functions by executing a control program stored in the memory 1660. An instruction interpretation unit 1651 interprets commands transmitted from the main CPU 11 and received by a communication circuit 1661, and specifies the control content and the reference sensor. Identification information of the actuator to be controlled (example: motor M1) may be included in the control content. As described above, the reference sensor may be identified by the identification information of the path sensor PSi, the identification information of the input port to which the path sensor PSi is connected, the identification information of the signal line 701 to which the path sensor PSi is connected, and the like. The communication circuit 1661 is connected to the communication circuit 1606 of the main CPU 11 via the communication line 401. i is an integer index. A timing monitoring unit 1652 monitors the change in the level of the detection signal output from the path sensor PSi (reference sensor) specified by the instruction interpretation unit 1651. Incidentally, the path sensor PSi is connected to the input circuit 1662. The input circuit 1662 outputs a high-level or low-level logic signal to the processor circuit 1650 according to the level of the input signal inputted from the path sensor PSi. The timing monitoring unit 1652 outputs to the actuator control unit 1653 that it was detected that the level of the signal output from the reference sensor has changed. The actuator control unit 1653 applies the control contents to the actuator specified by the instruction interpretation unit 1651. For example, the actuator control unit 1653, in synchronization with the timing at which the signal level of the path sensor PSi is changed, may stop or re-drive the motor Mi. The output circuit 1663 for supplying a drive signal to the motor Mi may be provided between the processor circuit 1650 and the motor Mi. As described in the second embodiment, the input circuit 1662, the synchronization signal line 1301 may be connected.

Technical Concept Derived from Embodiments

The conveyance roller 121 or the like is an example of a plurality of conveyance rollers that convey the sheet P while sandwiching the sheet P on the conveyance path. Motors M1 to M18 are examples of a plurality of motors for respectively driving the plurality of conveyance rollers. The sub CPUs 13 are an example of a plurality of sub CPUs for communicating with the main CPU 11 and respectively controlling the plurality of motors. The signal line 701 and the synchronization signal line 1301 together comprise an example of a shared signal line that is connected jointly to a plurality of sub CPUs 13 and to which a synchronizing signal to be a high level or low level is applied. The main CPU 11 selects the destination of a command to be executed in synchronization with the timing at which the level of a synchronization signal transmitted through the shared signal line changes in accordance with a length P of a sheet P in a conveyance direction of the sheet. A stop command and drive command described above are examples of the command. The main CPU 11 is configured to transmit the command to a sub CPU 13 selected as a destination among a plurality of sub CPUs 13. There is a sub CPU 13 that can be selected as a destination among the plurality of sub CPUs 13. The sub CPU 13 receives a command from the main CPU 11 and monitors a synchronization signal to be applied to the shared signal line. The sub CPU 13 is configured to execute the commands in synchronization with the timing at which the level of the synchronization signal changes.

The path sensors PS are an example of a plurality of sheet sensors for detecting the sheet P to be conveyed on the conveyance path. As illustrated in FIG. 7 or the like, at least one sheet sensor of the plurality of sheet sensors is configured to apply a synchronization signal to the shared signal line. As illustrated in step S1103 and the like, the main CPU 11 selects a sheet sensor connected to the shared signal line among the plurality of sheet sensors in accordance with the length of the sheet. The main CPU 11 is an example of a selected sheet sensor. The main CPU 11 transmits a command including the identification information of the reference sensor and the content (conveyance stoppage) of the control to the sub CPU which is to execute the command. The command may be an instruction to be executed in synchronization with the timing at which the level of the synchronization signal outputted by the reference sensor changes. The sub CPU 13 which receives the command executes the conveyance stop command in synchronization with the timing at which the level of the synchronization signal changes. Here, the synchronization signal is a signal applied to the signal line 701 from the sheet sensor (reference sensor) specified by the command received from the main CPU 11 (identification information).

The first sheet sensor may be connected to a plurality of sub CPUs via a first shared signal line, (example: a signal line 701*b*). The second sheet sensor may be connected to a plurality of sub CPUs via a second shared signal line, (example: a signal line 701*b*). Each of the plurality of sub CPUs specifies a shared signal line connected to the sheet sensor specified by the command, among the first shared signal line and the second shared signal line. Each of the plurality of sub CPUs executes a command in synchronization with a timing at which the level of the specified synchronization signal changes.

The serial communication line 401 is an example of a communication line connecting the main CPU and a plurality of sub CPUs. As described with respect to step S1105 and the like, a command may be included in a communication signal transmitted over the communication line.

As illustrated in FIG. 9A and FIG. 9B and the like, the main CPU 11 may be configured to transmit communication signals to a plurality of sub CPUs 13 at different times. In the first and second embodiments, communication signals are respectively transmitted to a plurality of sub CPUs 13 at different times, but this is merely an example. The technical ideas of the first and second embodiments can be applied even if a communication protocol capable of transmitting communication signals to a plurality of sub CPUs 13 at the same time is employed.

The main CPU 11 may monitor the position of the sheet P in the conveyance path based on the detection results of the plurality of sheet sensors. The main CPU 11 may select one sheet sensor among a plurality of sheet sensors (a reference sensor) and a sub CPU as a destination based on the position of the sheet P and the length of the sheet P.

The reference sensor is located more on the downstream side in the conveyance direction of the sheet P than the front end of the sheet P. Further, the reference sensor may be a sheet sensor closest to the front end of the sheet P.

A command is received by all the sub CPUs that control one of the plurality of motors involved in conveying the sheet P to which the command is to be applied. There may be a plurality of sheet sensors that detect the front end of the sheet P after the time at which the command is received. Further, the sheet sensor that is the closest sheet sensor to the front end of the sheet P may be selected.

As described in the first embodiment, the command may be a conveyance stop command (stop command) for stopping conveyance of the sheet P. As described in the second embodiment, the command may be a conveyance restart command (drive command) for restarting conveyance of the sheet P.

The main CPU 11 may transmit a conveyance restart command with the first sub CPU and the second sub CPU as destinations. The first sub CPU controls a first motor for driving the first conveyance roller which is stopped while the sheet P is sandwiched. The second sub CPU controls a second motor for driving the second conveyance roller which is stopped while the sheet P is sandwiched. The first sub CPU and the second sub CPU are notified that the conveyance restart command is to be executed in synchronization with the timing at which the level of the synchronization signal applied to the shared signal line changes.

The main CPU 11 selects one of the sheet sensors from among the plurality of sheet sensors according to the length of the sheet P. The main CPU 11 transmits a command indicating the identification information of the selected sheet sensor and the conveyance stop or conveyance restart to the sub CPUs, among the plurality of sub CPUs, that are to execute the command. This command is executed in synchronization with the timing at which the level of the synchronization signal output by the selected sheet sensor changes.

The sub CPU 13*d* is an example of a first sub CPU that communicates with the main CPU through a communication line. The motors M5 to M7 are examples of first motors controlled by the first sub CPU. The conveyance rollers driven by the motors M5 to M7 are examples of the first conveyance roller driven by the first motor. The sub CPU 13*c* is an example of a second sub CPU that communicates with the main CPU 11 through a communication line. The motors M8 to M10 are examples of second motors controlled by the second sub CPU. The conveyance rollers driven by the motors M8 to M10 are examples of a second conveyance roller that is disposed on the downstream side of a first conveyance roller in the conveyance direction of the sheet in the conveyance path and are driven by the second motor.

The sub CPU 13*b* is an example of a third sub CPU that communicates with the main CPU 11 through a communication line. The motors M11 to M14 are examples of third motors controlled by the third sub CPU. The conveyance rollers driven by the motors M11 to M14 are examples of a third conveyance roller that is disposed on the downstream side of a second conveyance roller in the conveyance direction of the sheet P and are driven by the third motor. The path sensor PS7 is an exemplary first sheet sensor connected to the first sub CPU via the first signal line and not connected to the second sub CPU and the third sub CPU. The path sensor PS10 is an exemplary second sheet sensor connected to the first sub CPU via a second signal line and not connected to the second sub CPU and the third sub CPU. The path sensor PS13 is an exemplary third sheet sensor connected to the first sub CPU via a third signal line, the second sub CPU, and the third sub CPU. The main CPU 11 selects one sheet sensor from the first sheet sensor, the second sheet sensor, and the third sheet sensor based on the position and length of the sheet. The main CPU 11 selects a destination of a command to be executed in synchronization with the timing at which the level of the synchronization signal output by the selected sheet sensor changes. The main CPU 11 transmits a command including the identification information and control content indicating the selected sheet sensor to the sub CPU selected as the destination. The first sub CPU, the second sub CPU, and the third sub CPU execute the command in synchronization with the timing at which the level of the synchronization signal output from the sheet sensor specified by the command received from the main CPU changes.

The image forming apparatus 1 may include a plurality of functional units. As illustrated in FIG. 2 and FIG. 3, and the like, a first functional unit may include a first sub CPU, a first motor, and a first conveyance roller. As illustrated in FIG. 2 and FIG. 3, and the like, a second functional unit may include a second sub CPU, a second motor, and a second conveyance roller. As illustrated in FIG. 2 and FIG. 3, and the like, a third functional unit may include a third sub CPU, a third motor, and a third conveyance roller.

The command may include identification information specifying a control target motor. The sub CPU 13 receiving the command may be configured to apply the command to the motor specified by the command.

The main CPU 11 is an example of a main control unit. The sub CPU 13 is an example of a sub control unit. The conveyance roller is an example of a conveying unit. The path sensor PS is an example of a detection unit.

The transfer unit 190 and the fixing device 310 are examples of an image forming unit that forms an image on a recording medium. The conveyance path 220 is an example of a conveyance path that guides the recording medium of which an image has been formed on a first surface by the image forming section to the image forming section so that an image is formed on a second surface of the recording medium by the image forming section. The second surface is the side opposite the first surface. The conveyance roller 121*a* is an example of a first conveyance roller which is provided in a conveyance path and conveys a recording medium. Motor M8 is an example of a first motor for driving the first conveyance roller. The sub CPU 13*c* is an exemplary first controller for controlling the first motor. The conveyance roller 221*a* is an example of a second conveyance roller which is provided in a conveyance path upstream of the first conveyance roller in the conveyance direction in which the recording medium is conveyed and conveys the recording medium. Motor M6 is an example of a second motor for driving the second conveyance roller. The sub CPU 13*d* is an exemplary second controller for controlling the second motor. The path sensor PS10 is provided in the conveyance path downstream of the first conveyance roller in the conveyance direction, and is an example of a first sensor that detects the front end of the recording medium. The path sensor PS13 is an example of a first sensor. The first sensor is connected to the first controller and the second controller. As illustrated in FIG. 8A, when the recording medium is to be stopped on the conveyance path, the length of the recording medium in the conveyance direction may be the first length (example: LP1). The first length is longer than the distance from the first conveyance roller to the second conveyance roller (example: LR) (LP1>LR). In this case, the first controller stops the first motor in accordance with the first sensor detecting the front end of the recording medium, and the second controller stops the second motor in accordance with the first sensor detecting the front end of the recording medium. As illustrated in FIG. 8B, when the recording medium is to be stopped on the conveyance path, the length of the recording medium in the conveyance direction may be a second length shorter than the first length (example: LP2). The second length is shorter than the distance from the first conveyance roller to the second conveyance roller (LP2<LR). In this case, the first controller stops the first motor in accordance with the first sensor detecting the front end of the recording medium, and the second controller continues to drive the second motor even if the first sensor detects the front end of the recording medium.

According to FIG. 8B, even if the conveyance of the sheet P is stopped, the conveyance of the subsequent sheet P' is continued, so that the distance from the back end of the sheet P to the front end of the sheet P' can be shortened.

As illustrated in FIG. 8A, when the length of the sheet P satisfies the above-mentioned condition (LP1>LR), the motors M2 to M8 are stopped because the path sensor PS10 detects the front end of the sheet P. That is, the conveyance of the sheet P by the conveyance rollers 121*a* and 221*a* is stopped. On the other hand, as illustrated in FIG. 8B, the length of the sheet P may be shorter (LP2<LR). In this case, since the path sensor PS10 detects the front end of the sheet P, the motors M7 and M8 are stopped, but the rotation of the motors M2 to M6 is continued. That is, the conveyance of the sheet P by the conveyance roller 121*a* is stopped, but the conveyance of the sheet P' by the conveyance roller 221*a* is continued. Thereafter, when the path sensor PS7 detects the front end of the sheet P', the motors M4 to M6 also stop, and the conveyance of the sheet P' by the conveyance roller 221*a* also stops. That is, the distance from the back end of the sheet P to the front end of the sheet P' becomes sufficiently short. This improves the productivity of the image forming apparatus. The productivity is, for example, the number of sheets on which an image is formed per unit time.

The main CPU 11 is an exemplary third controller for controlling the first controller and the second controller. The path sensor PS10 is provided in the conveyance path and is an exemplary second sensor for detecting the front end of the recording medium. The second sensor is connected to the first controller and the second controller. Alternatively, as with the path sensor PS7, the second sensor is not directly connected to the first controller, but may be connected to the second controller. Alternatively, the path sensor PS7 may also be connected to both the first controller and the second controller.

The third controller may select one of the first sensor and the second sensor according to the length of the recording medium in the conveyance direction. When the recording medium is to be stopped on the conveyance path, the length of the recording medium in the conveyance direction may be the first length. In this case, the first controller stops the first motor in accordance with the sensor selected by the third controller detecting the front end of the recording medium, and the second controller stops the second motor in accordance with the sensor selected by the third controller detecting the front end of the recording medium. Meanwhile, when the recording medium is to be stopped on the conveyance path, the length of the recording medium in the conveyance direction may be the second length. In this case, the first controller stops the first motor in accordance with the sensor selected by the third controller detecting the front end of the recording medium, and the second controller continues to drive the second motor in accordance with the sensor selected by the third controller detecting the front end of the recording medium.

The third controller may select the sensor located downstream in the conveyance direction from the front end of the recording medium and closest to the front end of the recording medium. The third controller, based on the detection state of the plurality of path sensors, can recognize where the front end of the sheet is located on the conveyance path. For example, if the path sensor PS9 detects the presence of a sheet and the path sensor PS10 detects the absence of the sheet, the third controller can recognize that the front end of the sheet is positioned between the path sensor PS9 and PS10. Further, the third controller, as the closest sensor, selects the path sensor PS10.

The sheet cassette 110 is an example of a stacking unit on which a recording medium is stacked. The sheet feeding mechanism 111 is an example of a pick-up roller that feeds the recording medium stacked on the stacking unit. The conveyance path 120 is an example of a second conveyance path that guides the recording medium fed by the pick-up roller to the image forming section. The conveyance path 124 merges into the second conveyance path (the conveyance path 120) at a position between the image forming section and the pick-up roller.

In some cases, the recording medium should not be stopped on the conveyance path. In this case, the first controller continues to drive the first motor even if the first sensor detects the front end of the recording medium, and the second controller continues to drive the second motor even if the first sensor detects the front end of the recording medium.

The housing 101 is an example of a first housing including a transfer unit for transferring a toner image onto a recording medium. The housing 201 is an example of a second housing including a conveying unit that conveys a recording medium to which a toner image has been transferred by the transfer unit and has been discharged from the first housing. The housing 301 is an example of a third housing comprising a fixing unit that fixes a toner image to a recording medium which has been discharged from the second housing. The conveyance paths 124, 220, and 327 are examples of conveyance paths that are disposed in the first housing, the second housing, and the third housing and configured to guide the recording medium of which an image has been formed on a first surface to the transfer unit so that an image is formed on a second surface of the recording medium, to a first surface of which an image has been formed. The second surface is the side opposite the first surface. The conveyance roller 121*a* is an example of a first conveyance roller arranged on the conveyance path in the first housing and configured to convey the recording medium. Motor M8 is an example of a first motor for driving the first conveyance roller. The sub CPU 13c is an exemplary first controller for controlling the first motor. The conveyance roller 221a is an example of a second conveyance roller arranged on the conveyance path in the second housing and configured to convey the recording medium. Motor M6 is an example of a second motor for driving the second conveyance roller. The sub CPU 13d is an exemplary second controller for controlling the second motor. The path sensor PS10 is an example of a first sensor which is provided in a conveyance path downstream of the first conveyance roller in the conveyance direction in which the recording medium is conveyed and detects the front end of the recording medium. The first sensor is connected to the first controller and the second controller. Meanwhile, when the recording medium is to be stopped on the conveyance path between the first housing and the second housing, the length of the recording medium in the conveyance direction may be the first length. The first length is longer than the distance from the first conveyance roller to the second conveyance roller. In this case, the first controller stops the first motor in accordance with the first sensor detecting the front end of the recording medium, and the second controller stops the second motor in accordance with the first sensor detecting the front end of the recording medium. Meanwhile, when the recording medium is to be stopped on the conveyance path between the first housing and the second housing, the length of the recording medium in the conveyance direction may be the second length shorter than the first length. The second length is shorter than the distance from the first conveyance roller to the second conveyance roller. In this case, the first controller stops the first motor in accordance with the first sensor detecting the front end of the recording medium, and the second controller continues to drive the second motor even if the first sensor detects the front end of the recording medium.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-010626 filed Jan. 26, 2021, and Japanese Patent Application No. 2021-183449 filed Nov. 10, 2021, which are hereby incorporated by reference herein in their entirety.

What is claimed is:
1. An image forming apparatus comprising:
  an image forming unit configured to form an image on a recording medium;
  a conveyance path configured to guide the recording medium of which an image has been formed on a first surface by the image forming unit to the image forming unit so that an image is formed on a second surface of the recording medium by the image forming unit, wherein the second surface is a surface that is opposite to the first surface;
  a first conveyance roller arranged on the conveyance path and configured to convey the recording medium;
  a first motor configured to drive the first conveyance roller;
  a first controller configured to control the first motor;
  a second conveyance roller arranged on the conveyance path upstream of the first conveyance roller with respect to a conveyance direction in which the recording medium is conveyed and configured to convey the recording medium;
  a second motor configured to drive the second conveyance roller;
  a second controller configured to control the second motor; and
  a sensor arranged on the conveyance path downstream of the first conveyance roller in the conveyance direction and configured to detect a front end of the recording medium, wherein the sensor is connected to the first controller and the second controller,
  wherein in a case where the recording medium is to be stopped on the conveyance path and a length of the recording medium in the conveyance direction is a first length, the first controller stops the first motor in accordance with the sensor detecting the front end of the recording medium, and the second controller stops the second motor in accordance with the sensor detecting the front end of the recording medium, the first length being longer than a distance from the first conveyance roller to the second conveyance roller, and
  wherein, in a case where the recording medium is to be stopped on the conveyance path and the length of the recording medium in the conveyance direction is a second length that is shorter than the first length, the first controller stops the first motor in accordance with the sensor detecting the front end of the recording medium, and the second controller continues driving of the second motor even if the sensor detects the front end of the recording medium,
  the second length being shorter than the distance from the first conveyance roller to the second conveyance roller.
2. The image forming apparatus according to claim 1, further comprising:

a third controller configured to control the first controller and the second controller; and a second sensor arranged on the conveyance path and configured to detect the front end of the recording medium, wherein the second sensor is connected to the first controller and the second controller, wherein the third controller selects one of the sensor and the second sensor in accordance with the length of the recording medium in the conveyance direction, wherein, in a case where the recording medium is to be stopped on the conveyance path and the length of the recording medium in the conveyance direction is the first length, the first controller stops the first motor in accordance with the sensor selected by the third controller detecting the front end of the recording medium, and the second controller stops the second motor in accordance with the sensor selected by the third controller detecting the front end of the recording medium, and wherein, in a case where the recording medium is to be stopped on the conveyance path and the length of the recording medium in the conveyance direction is the second length, the first controller stops the first motor in accordance with the sensor selected by the third controller detecting the front end of the recording medium, and the second controller continues to drive the second motor in accordance with the sensor selected by the third controller detecting the front end of the recording medium.

3. The image forming apparatus according to claim 2, wherein
the third controller selects a sensor located downstream in the conveyance direction from the front end of the recording medium and closest to the front end of the recording medium.

4. The image forming apparatus according to claim 1, further comprising:
a stacking unit on which a recording medium is to be stacked;
a pick-up roller configured to feed the recording medium stacked on the stacking unit; and
a second conveyance path configured to guide the recording medium fed by the pick-up roller to the image forming unit,
wherein the conveyance path, at a position between the image forming unit and the pick-up roller, merges with the second conveyance path.

5. The image forming apparatus according to claim 1, wherein in a case where the recording medium is not to be stopped on the conveyance path, the first controller continues to drive the first motor even if the sensor detects the front end of the recording medium, and the second controller continues to drive the second motor even if the sensor detects the front end of the recording medium.

6. An image forming apparatus comprising:
a first housing comprising a transfer unit configured to transfer a toner image to a recording medium;
a second housing comprising a conveying unit configured to convey the recording medium to which the toner image has been transferred by the transfer unit and has been discharged from the first housing;
a third housing comprising a fixing unit configured to fix the toner image to the recording medium which has been discharged from the second housing;
a conveyance path disposed in the first housing, the second housing, and the third housing and configured to guide the recording medium of which an image has been formed on a first surface to the transfer unit so that an image is formed on a second surface of the recording medium, wherein the second surface is a surface that is opposite to the first surface;
a first conveyance roller arranged on the conveyance path in the first housing and configured to convey the recording medium;
a first motor configured to drive the first conveyance roller;
a first controller configured to control the first motor;
a second conveyance roller arranged on the conveyance path in the second housing and configured to convey the recording medium;
a second motor configured to drive the second conveyance roller;
a second controller configured to control the second motor;
a sensor arranged on the conveyance path downstream of the first conveyance roller in a conveyance direction in which the recording medium is conveyed and configured to detect a front end of the recording medium, wherein the sensor is connected to the first controller and the second controller,
wherein in a case where the recording medium is to be stopped on the conveyance path between the first housing and the second housing and a length of the recording medium in the conveyance direction is a first length, the first controller stops the first motor in accordance with the sensor detecting the front end of the recording medium, and the second controller stops the second motor in accordance with the sensor detecting the front end of the recording medium, the first length being longer than a distance from the first conveyance roller to the second conveyance roller, and
wherein in a case where the recording medium is to be stopped on the conveyance path between the first housing and the second housing and the length of the recording medium in the conveyance direction is a second length that is shorter than the first length, the first controller stops the first motor in accordance with the sensor detecting the front end of the recording medium, and the second controller continues to drive the second motor even if the sensor detects the front end of the recording medium,
the second length being shorter than the distance from the first conveyance roller to the second conveyance roller.

* * * * *